(12) United States Patent
Watanabe et al.

(10) Patent No.: US 10,341,526 B2
(45) Date of Patent: Jul. 2, 2019

(54) FACSIMILE COMMUNICATION DEVICE, LINE DISCONNECTION JUDGMENT METHOD AND NON-TRANSITORY RECORDING MEDIUM STORING A COMPUTER READABLE PROGRAM

(71) Applicant: KONICA MINOLTA, INC., Chiyoda-ku, Tokyo (JP)

(72) Inventors: Yukio Watanabe, Hachioji (JP); Kazunori Ikeda, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/789,910

(22) Filed: Oct. 20, 2017

(65) Prior Publication Data

US 2018/0124275 A1    May 3, 2018

(30) Foreign Application Priority Data

Nov. 2, 2016  (JP) .................................. 2016-215339
Aug. 17, 2017 (JP) .................................. 2017-157648

(51) Int. Cl.
  *H04N 1/00* (2006.01)
  *H04N 1/327* (2006.01)

(52) U.S. Cl.
  CPC ....... *H04N 1/32728* (2013.01); *H04N 1/0001* (2013.01); *H04N 1/00037* (2013.01); *H04N 1/32734* (2013.01); *H04N 1/32745* (2013.01); *H04N 2201/0094* (2013.01)

(58) Field of Classification Search
  None
  See application file for complete search history.

(56) References Cited

U.S. PATENT DOCUMENTS

| | | | | | |
|---|---|---|---|---|---|
| 5,347,572 | A | * | 9/1994 | Avni | G01R 19/003 358/400 |
| 5,790,656 | A | * | 8/1998 | Rahamim | H04M 19/08 379/399.01 |
| 5,809,132 | A | * | 9/1998 | Sakamoto | H04M 1/82 379/161 |
| 5,877,872 | A | * | 3/1999 | Nomura | H04N 1/32704 358/468 |
| 6,005,676 | A | * | 12/1999 | Morimoto | H04N 1/32704 358/442 |

(Continued)

FOREIGN PATENT DOCUMENTS

| | | |
|---|---|---|
| CN | 104348991 A | 2/2015 |
| JP | 09149226 A | 6/1997 |
| JP | 2007174061 A | 7/2007 |

OTHER PUBLICATIONS

Chinese Office Action (and English language translation thereof) dated Jan. 31, 2019 issued in counterpart Chinese Application No. 201711018618.0.

*Primary Examiner* — Anh-Vinh T Nguyen
(74) *Attorney, Agent, or Firm* — Holtz, Holtz & Volek PC

(57) ABSTRACT

Disclosed is a facsimile communication device, including: a line voltmeter that measures a voltage of a line used for a facsimile communication; and a hardware processor that: detects a predetermined change in the voltage of the line, in the facsimile communication; and judges whether a facsimile device of an opposite side opens the line or not according to whether the predetermined change is detected.

10 Claims, 29 Drawing Sheets

(56) References Cited

U.S. PATENT DOCUMENTS

| | | | | |
|---|---|---|---|---|
| 6,442,253 B1* | 8/2002 | Onose | H04N 1/00281 | 358/400 |
| 6,665,381 B1* | 12/2003 | Nassimi | H04M 11/062 | 379/142.07 |
| 2004/0114736 A1* | 6/2004 | Saito | H04M 1/82 | 379/100.06 |
| 2005/0031098 A1* | 2/2005 | Ito | H04M 1/82 | 379/100.01 |
| 2005/0216649 A1* | 9/2005 | Yoshida | H04N 1/00204 | 710/313 |
| 2006/0233329 A1* | 10/2006 | Ito | H04M 11/066 | 379/100.01 |
| 2006/0256395 A1* | 11/2006 | Ito | H04N 1/32016 | 358/440 |
| 2008/0276113 A1* | 11/2008 | Tabeta | G06F 1/08 | 713/500 |
| 2009/0129558 A1* | 5/2009 | Ishizu | H04M 1/82 | 379/22.03 |
| 2013/0223603 A1* | 8/2013 | Nakazawa | H04N 1/0001 | 379/100.01 |
| 2014/0043637 A1* | 2/2014 | Mori | G06K 15/406 | 358/1.13 |
| 2014/0369490 A1* | 12/2014 | Koizumi | H04M 1/82 | 379/377 |
| 2015/0036809 A1* | 2/2015 | Maruyama | H04N 1/32728 | 379/100.01 |
| 2016/0036596 A1* | 2/2016 | Fukushima | H04L 12/12 | 370/241 |
| 2016/0150097 A1* | 5/2016 | Ishida | H04N 1/00891 | 358/1.14 |
| 2016/0337509 A1* | 11/2016 | Ohtani | H04M 1/82 | |
| 2016/0360064 A1* | 12/2016 | Miura | H04N 1/32728 | |
| 2017/0094106 A1* | 3/2017 | Ogawa | H04N 1/32708 | |
| 2017/0208206 A1* | 7/2017 | Iguchi | H04N 1/00891 | |

* cited by examiner

FIG.16

| ID | TRANSMITTER/ RECEIVER | SILENCE SECTION | | |
|---|---|---|---|---|
| | | SIGNAL TO BE MEASURED | START TIMING | END TIMING |
| 1 | TRANSMITTER | TSI/DCS | 1 2. 0 s | 1 5. 5 s |
| | RECEIVER | CSI/DIS | 1 0. 0 s | 1 4. 0 s |
| | RESET | EXTRACTED SECTION | 1 0. 0 s | 1 5. 5 s |

| ID | TRANSMITTER/ RECEIVER | SIGNAL TO BE MEASURED | SILENCE SECTION | |
|---|---|---|---|---|
| | | | START TIMING | END TIMING |
| 1 | TRANSMITTER | TSI/DCS | 1 2. 0 s | 1 5. 5 s |
| | RECEIVER | CSI/DIS | 1 0. 0 s | 1 4. 0 s |
| | RESET | EXTRACTED SECTION | 1 2. 0 s | 1 4. 0 s |

| ID | TRANSMITTER/ RECEIVER | SIGNAL TO BE MEASURED | SILENCE SECTION | |
|---|---|---|---|---|
| | | | START TIMING | END TIMING |
| 1 | TRANSMITTER | TSI/DCS | 12.0 s | 15.5 s |
| | RECEIVER | CSI/DIS | 10.0 s | 14.0 s |
| | RESET | EXTRACTED SECTION | 10.0 s | 15.5 s |
| | EXTENDED | EXTRACTED SECTION | 9.5 s | 16.5 s |

FIG.22

| ID | TRANSMITTER /RECEIVER | SILENCE SECTION 1 | | | SILENCE SECTION 2 | | |
|---|---|---|---|---|---|---|---|
| | | SIGNAL TO BE MEASURED | START TIMING | END TIMING | SIGNAL TO BE MEASURED | START TIMING | END TIMING |
| 1 | TRANSMITTER | TSI/DCS | 12.0 s | 15.5 s | TSI/DCS | 22.0 s | 25.5 s |
| | RECEIVER | CSI/DIS | 10.0 s | 14.0 s | CSI/DIS | 20.0 s | 24.0 s |
| | RESET | EXTRACTED SECTION | 10.0 s | 15.5 s | EXTRACTED SECTION | 20.0 s | 25.5 s |

| ID | TRANSMITTER /RECEIVER | SILENCE SECTION 1 | | |
|---|---|---|---|---|
| | | SIGNAL TO BE MEASURED | START TIMING | END TIMING |
| 1 | TRANSMITTER | TSI/DCS | 12.0 s | 15.5 s |
| | RECEIVER | CSI/DIS | 10.0 s | 14.0 s |
| | RESET | EXTRACTED SECTION | 10.0 s | 15.5 s |

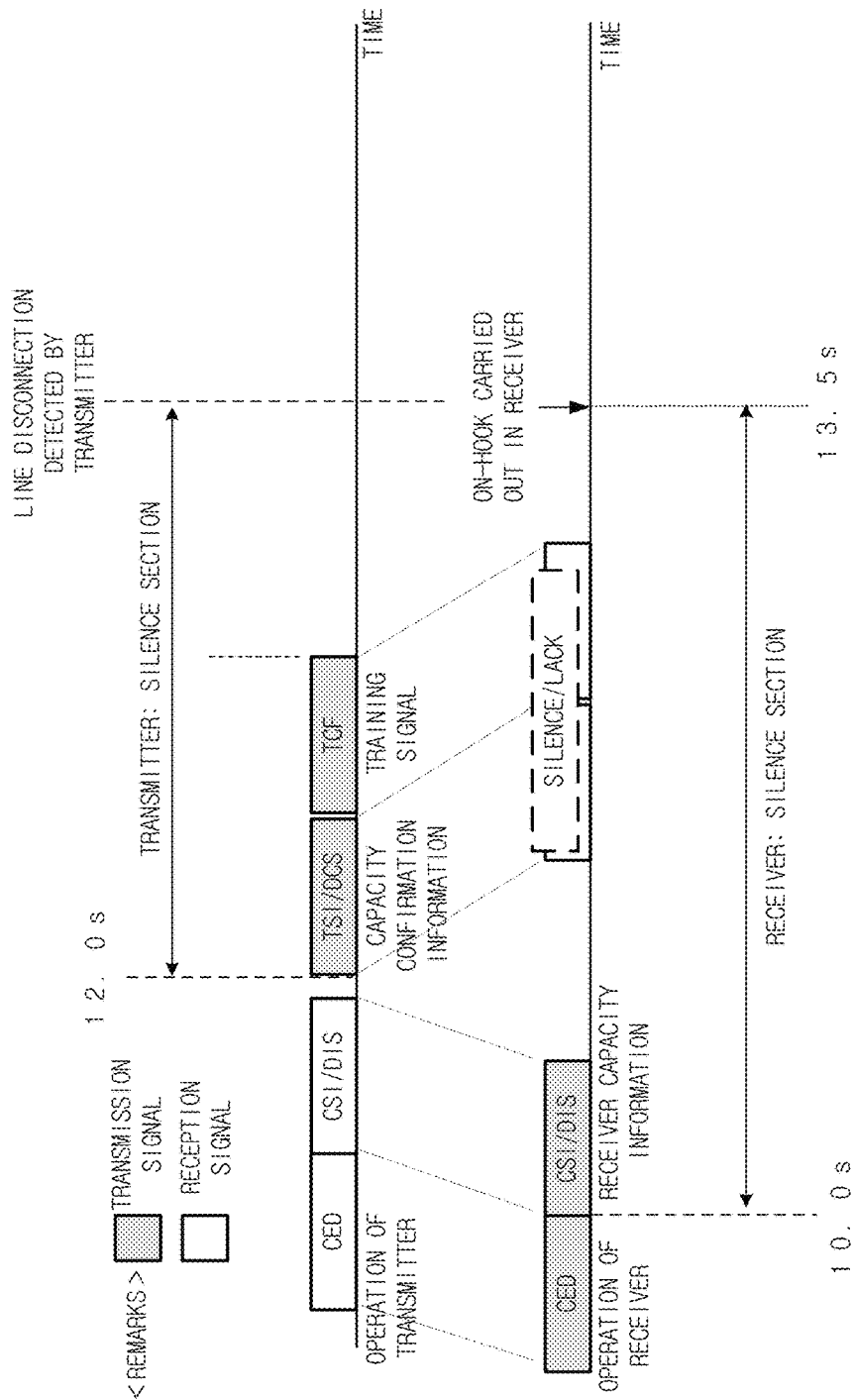

<DISTURBANCE EXAMPLE>
• DATA IS ACCUMLATED IN BUFFER → DELAYED
• ECHO CANCELLER → THERE ARE SOME CASES IN WHICH DATA IS LACKED
• OTHERS : DATA MODIFICATION, T.38 RELAY

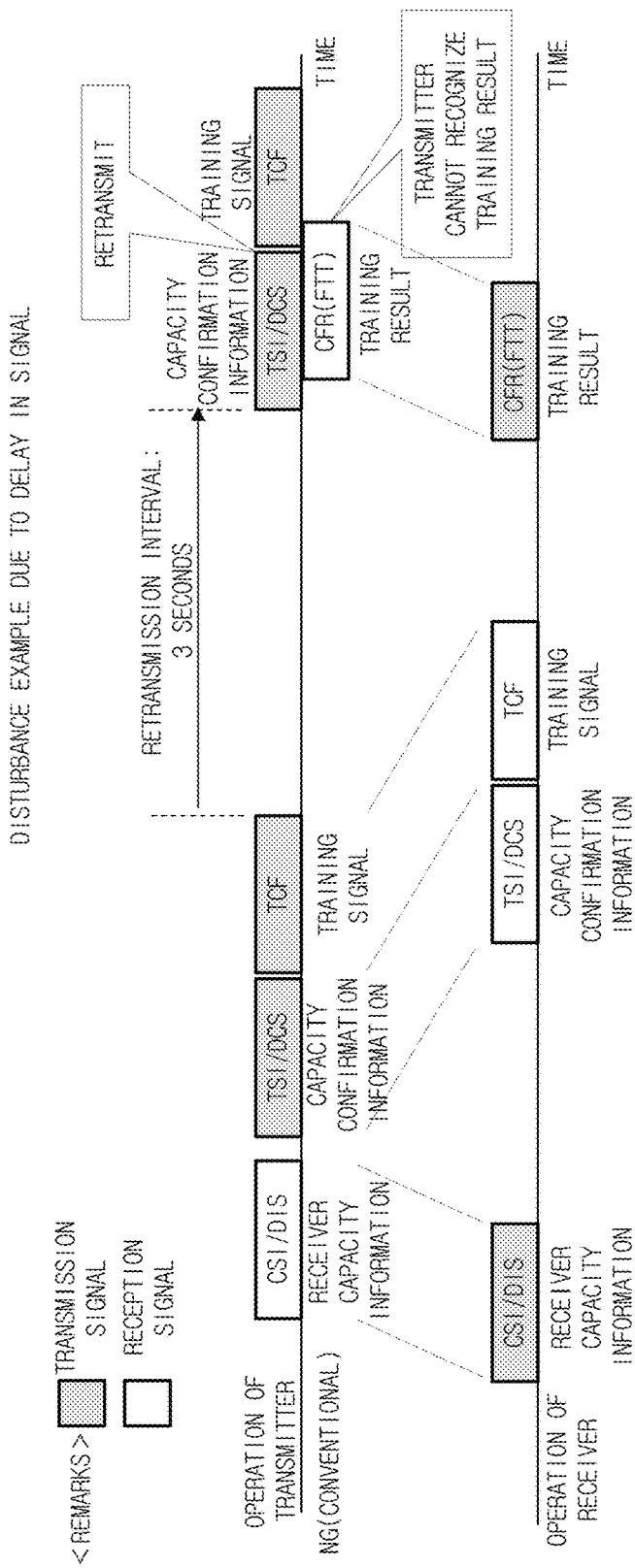

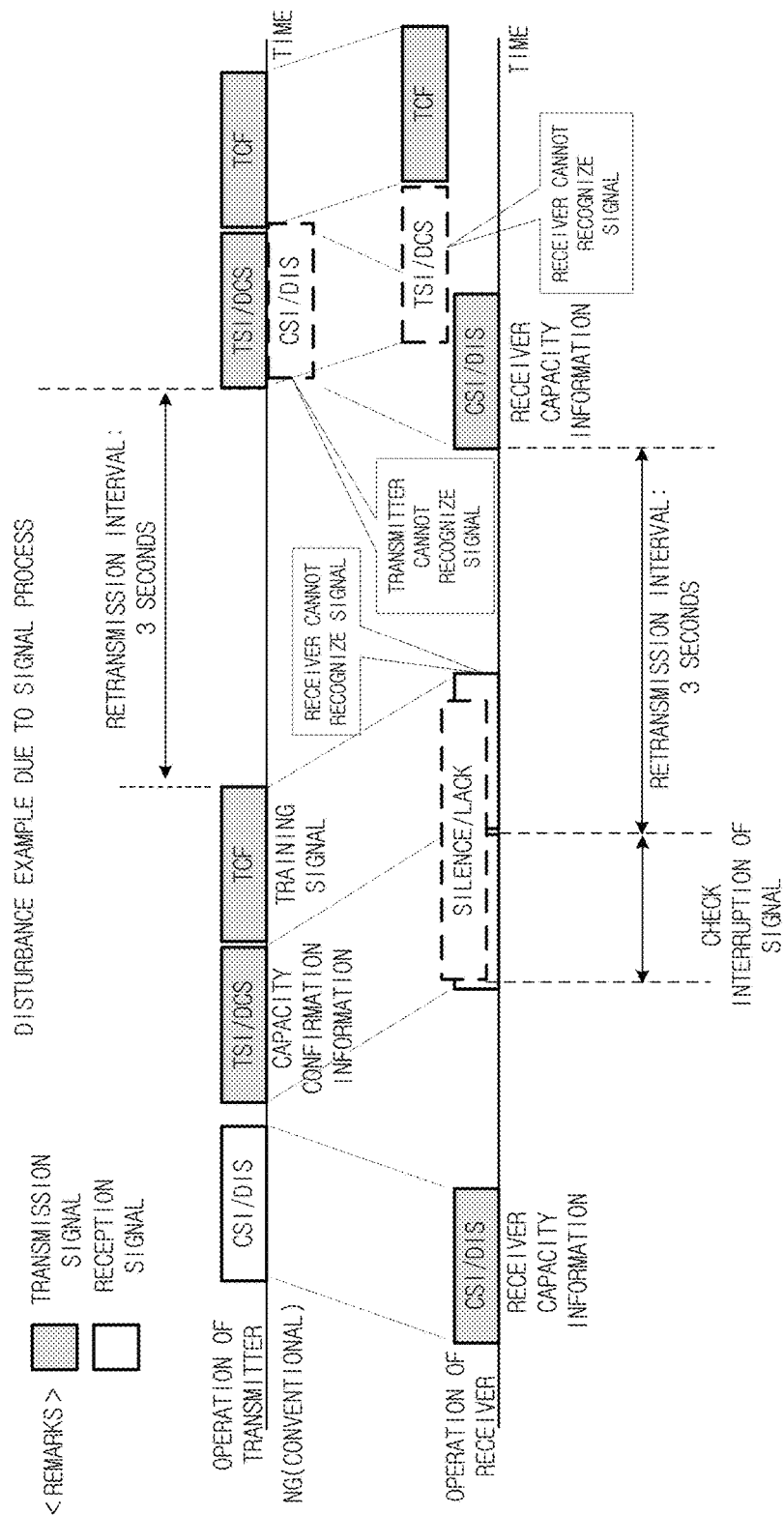

FACSIMILE COMMUNICATION DEVICE, LINE DISCONNECTION JUDGMENT METHOD AND NON-TRANSITORY RECORDING MEDIUM STORING A COMPUTER READABLE PROGRAM

Japanese Patent Applications No. 2016-215339 filed on Nov. 2, 2016 and No. 2017-157648 filed on Aug. 17, 2017, including description, claims, drawings, and abstract the entire disclosure is incorporated herein by reference in its entirety.

BACKGROUND

Technological Field

The present invention relates to a facsimile communication device, a line disconnection judgment method and a non-transitory recording medium storing a computer readable program which can detect the open (disconnection) of the line, which is caused in the facsimile device of the opposite side, during the facsimile communication.

Description of the Related Art

As a social infrastructure used in the facsimile (FAX) communication, the environment (digital lines) in which the network is interposed by IP-PBX (Internet Protocol Private Branch eXchange), various types of Network-Gateway devices, TA (Terminal Adapter) and the like in the middle of the paths, is increased. In the FAX communication (VoIP (Voice over Internet Protocol) communication/FoIP (Fax over Internet Protocol communication) using the above-described lines, many line disturbances are caused and the communication errors are extremely increased. Therefore, it is requested to specifically grasp the cause of the communication error and the timing at which the disturbance is caused.

As the specific case thereof, mainly in case that the line is disconnected when the receiver detects the abnormality, because the transmitter does not immediately recognize the disconnection of the line, which is caused in the receiver, there are some cases in which the transmitter continues to capture the line for up to several minutes since the receiver disconnects the line. Therefore, the transmitter cannot immediately disconnect the line.

As the facsimile communication device for solving the above problem, the following facsimile communication device is disclosed in Japanese Patent Application Publication No. H09-149226. In this facsimile communication device, the communication method in which the flag sequence is transmitted to the transmitter from the receiver during the transmission of the image data, is adopted. When the flag sequence transmitted from the receiver is lost, the transmitter detects the abnormality caused in the receiver.

Further, as the communication environment of the facsimile communication, the IP telephone network in which the network is interposed by the exchanges, such as IP-PBX (Internet Protocol Private Branch eXchange), various types of Network-Gateway devices, TA (Terminal Adapter) and the like, has been increased. In the IP telephone network, there are many cases in which the signals are processed by the exchanges. FIG. 25 shows the part in which the sound data is processed in the IP telephone network. FIG. 26 shows the delay in the signal transmission in the IP telephone network.

As a specific case in which the signal is processed, it is generally known that when the exchangers (TA/PBX/GW) which are provided in the middle of the paths detect the FAX signal (FAX terminal identification tone of the transmitter side: CNG; FAX terminal identification tone of the receiver side: CED/ANSam), the operation mode of each exchanger is switched, such as the sound data is transmitted after the sound data is accumulated in the buffer. It is confirmed that the delay in the signal or the lack of the signal is caused (the silence section is caused) due to the switch of the mode and the communication error is caused.

In the facsimile communication, the mechanism for causing the communication error due to the delay in the signal or the lack of the signal will be explained as compared with the normal case in which the delay in the signal or the lack of the signal is not caused.

FIG. 27 shows the normal communication procedure (communication sequence). In this procedure, the phase B which is the phase after the communication is established, will be explained. The receiver transmits the receiver capacity information (CSI (Called Subscriber Identification)/DIS) indicating the capacity of the receiver (the resolution, the size of the original, the maximum communication speed and the like) to the transmitter.

The transmitter which receives the receiver capacity information, determines the communication mode, such as the resolution and the like, in accordance with the transmission condition which is set to the transmitter (the communication speed, the resolution and the like), the capacity of the receiver, which is recognized from the receiver capacity information, and the like. Then, the transmitter transmits the capacity confirmation information (TSI (Transmitting Subscriber Identification)/DCS (Digital Command Signal)) indicating the determined communication mode to the receiver. Further, the transmitter transmits the training signal (TCF) for confirming the condition of the communication line, to the receiver.

The signals which are transmitted from the receiver to the transmitter and the signals which are transmitted from the transmitter to the receiver are delayed to a certain degree while the signals are transmitted via the communication line, and reach the facsimile device of the opposite side.

The receiver confirms the condition of the communication line by receiving the training signal. When the receiver recognizes the finish of the transmission of the training signal, the receiver transmits the training result to the transmitter. For example, in case that the receiver normally receives the training signal and finishes the preparation for receiving the data, the receiver transmits the CFR (Confirmation To Receive) signal as the training result. On the other hand, the receiver fails in the training, the receiver transmits the FTT signal.

In case that the transmitter receives the CFR signal as the training result from the receiver before the predetermined retransmission interval (3 seconds) elapses since the transmission of the training signal is finished, the transmitter finishes the phase B and transfers to the phase C to transmit the image data.

FIG. 28 shows an example of the case in which the transmitter cannot receive the training result from the receiver before the retransmission interval elapses. In FIG. 28, the delay caused in the communication line is more than that of FIG. 27. Therefore, the training result (CFR) transmitted from the receiver to the transmitter reaches the transmitter after the retransmission interval (3 seconds) elapses since the transmitter finishes the transmission of the training signal. Because the transmitter cannot receive the training result from the receiver before the retransmission interval elapses (because the silence section in which the intended signal is not received from the receiver is caused), the transmitter retransmits the capacity confirmation information (TSI/DCS) and the training signal (TCF). Because the CFR signal transmitted from the receiver reaches the transmitter when the transmitter retransmits the capacity confirmation information and the training signal, the transmitter cannot receive the CFR signal. As a result, the communication error is caused.

In FIG. 29, because the capacity confirmation information (TSI/DCS) and the training signal (TCF) which are transmitted from the transmitter are lacked in the IP telephone network, the silence section which exceeds the retransmission interval for the receiver capacity information (CSI/DIS signal) is caused in the receiver. As a result, the receiver retransmits the receiver capacity information (CSI/DIS signal) to the transmitter. Because the transmitter cannot receive the training result from the receiver before the retransmission interval elapses (because the silence section which exceeds the retransmission interval is caused), the transmitter retransmits the capacity confirmation information (TSI/DCS) and the training signal (TCF). In the transmitter, the retransmitted capacity confirmation information collides with the receiver capacity information (CSI/DIS signal) which is retransmitted by the receiver. Therefore, the transmitter cannot identify the receiver capacity information (CSI/DIS signal). Further, in also the receiver, the collision between the signals is caused. Therefore, the receiver cannot identify the capacity confirmation information (TSI/DCS) and the training signal (TCF) which are retransmitted by the transmitter. As a result, the communication error is caused.

In case that the disturbance is caused due to the delay in the signal in the IP telephone network as described above, it is difficult to specify the cause of the disturbance by the analysis using the protocol trace or the analysis using the sound data obtained from only one of the transmitter and the receiver. Therefore, in general, the communication sound is recorded in each of the transmitter and the receiver when the disturbance is caused, and the cause of the disturbance is analyzed by actually listening to recorded sound data to compare them.

In Japanese Patent Application Publication No. 2007-174061, the following control method for stopping the facsimile communication is disclosed. In the facsimile communication using the IP telephone network, when the silence section is caused due to the increase in the traffic load of the provided exchangers, because the retransmission request is increased and communication time becomes long, the facsimile device is occupied by the communication process. In order to solve this trouble, in this control method, the silence section is detected by a filter circuit. When the number of the detected silence sections exceeds the predetermined number, the facsimile communication is stopped.

In the facsimile communication device disclosed in Japanese Patent Application Publication No. H09-149226, it is required to use the special standard (G3C system) different from G3-FAX standard (which is the ITU-T standard) which is a general facsimile communication standard. In the G3-FAX standard which is widely popularized, there is no protocol in which the flag sequence is transmitted from the receiver during the transmission of the image data. Therefore, the above problem cannot be solved by adopting the method disclosed in Japanese Patent Application Publication No. H09-149226.

Further, in the method for analyzing the cause of the disturbance by actually listening to and comparing the recorded data of the communication sound in each of the transmitter and the receiver when the disturbance is caused, an operator must listen to the long recorded data and the analysis work is increased.

In the method disclosed in Japanese Patent Application Publication No. 2007-174061, by stopping the communication, it is possible to temporarily release the unnecessary occupation of the facsimile device. However, it is not possible to contribute to the investigation into the cause of the disturbance.

SUMMARY

One of the objects of the present invention is to provide a facsimile communication device, a line disconnection judgment method and a non-transitory recording medium storing a computer readable program in which the transmitter can detect the abnormality caused in the receiver soon without depending on the FAX communication standard in order to handle the abnormality.

To achieve at least one of the abovementioned objects, according to an aspect of the present invention, a facsimile communication device reflecting one aspect of the present invention, comprises:

a line voltmeter that measures a voltage of a line used for a facsimile communication; and a hardware processor that:

detects a predetermined change in the voltage of the line, in the facsimile communication; and judges whether a facsimile device of an opposite side opens the line or not according to whether the predetermined change is detected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 3A to 3C are views showing the timing at which the line voltage is stored, and the like;

FIG. 16 is a view showing the third table in which the time information relating to the extracted section which is specified in accordance with the predetermined standard is additionally registered;

FIG. 19 is a view showing the third table in which the time information relating to the extracted section which is specified in accordance with another standard is additionally registered;

FIG. 20 is a view showing the third table in which the extended extracted section is additionally registered;

FIG. 22 is a view showing the situation in which one silence section is selected from a plurality of silence sections extracted in accordance with the same control signals in one communication and the other silence sections are discarded;

FIG. 23 is a view showing the silence section in case that the line is disconnected in the communication due to the on-hook operation carried out by a user;

FIG. 28 is a view showing an example of the communication sequence in case that the training result cannot be received from the receiver in the transmitter before the lapse of the retransmission interval; and FIG. 29 is a view showing an example of the communication sequence in case that the TSI/DCS and the training signal which are transmitted from the transmitter are lacked in the IP telephone network.

DETAILED DESCRIPTION OF PREFERRED EMBODIMENTS

Hereinafter, one or more embodiments of the present invention will be described with reference to the drawings. However, the scope of the invention is not limited to the disclosed embodiments.

Figure 1:
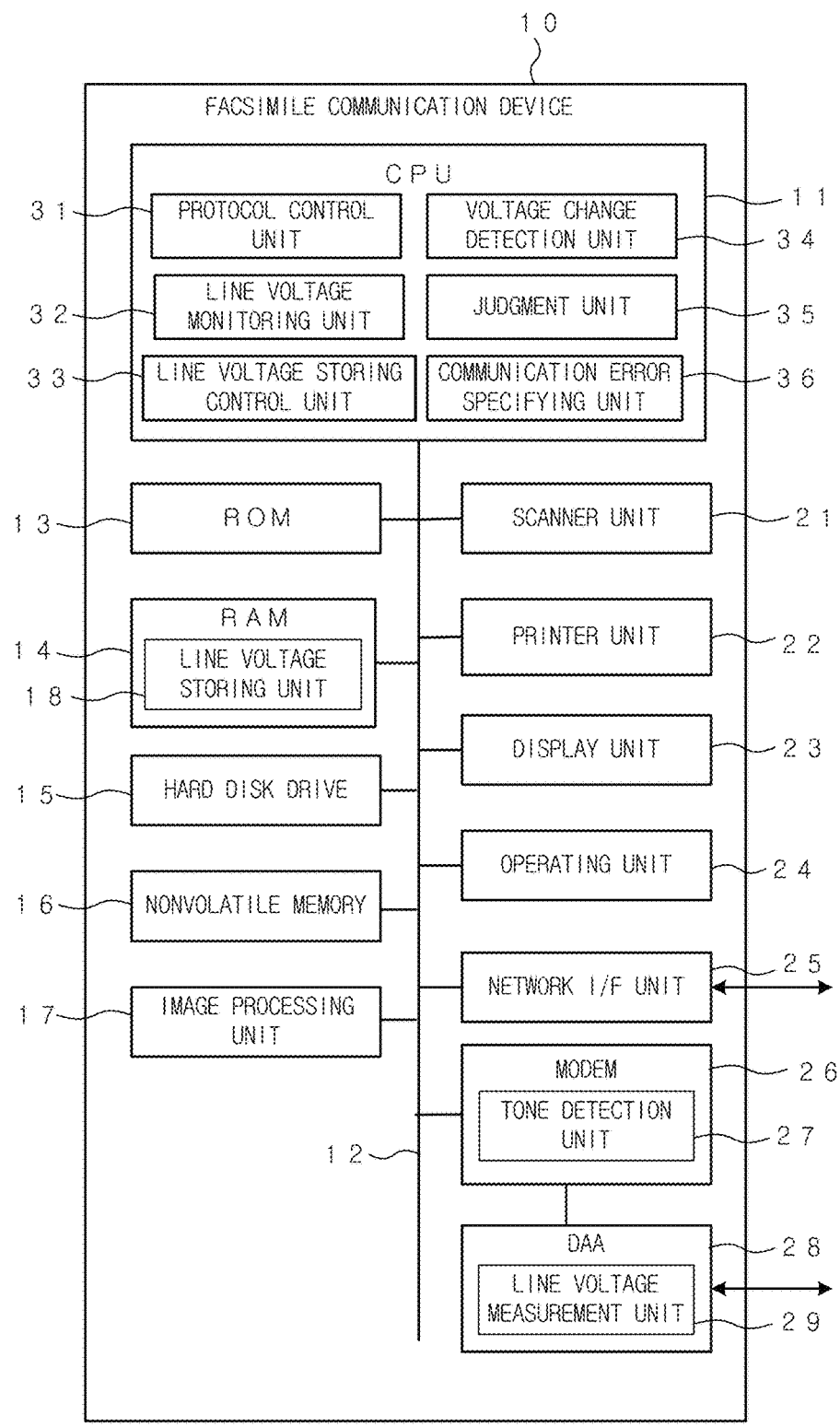
FIG. 1 is a block diagram showing the schematic configuration of the facsimile communication device according to the first embodiment.

First Embodiment:

FIG. 1 is a block diagram showing the schematic configuration of the facsimile communication device 10 according to the first embodiment. The facsimile communication device 10 is connected with another facsimile communication device 10 via the communication line including the digital line and the analog line.

The facsimile communication device 10 has the function for monitoring the line voltage during the facsimile communication, and for judging whether the line is opened in the facsimile device of the opposite side in accordance with the change in the line voltage at the predetermined change pattern.

Conventionally, the method for confirming the status of the facsimile device of the opposite side (the method for confirming whether the line is opened in the facsimile device of the opposite side) depends on the protocol used in the facsimile communication. As shown in the left part of FIG. 2, in the conventional technology, the period in which the open of the line, which is caused in the facsimile device of the opposite side can be confirmed is limited to the period except the transmission of the image data. That is, the protocol is not used in the transmission of the image data, and it is not possible to confirm the status of the facsimile device of the opposite side because the image data is transmitted unilaterally.

Therefore, for example, in case that the line is disconnected by the facsimile device of the opposite side immediately after the transmission phase of the image data is entered, the transmitter cannot recognize the disconnection of the line, which is caused in the facsimile device of the opposite side, until the transmission of the image data to be transmitted is finished (until the lapse of 4 minutes at the maximum in the G3 standard). Further, the timing at which the line is disconnected by the facsimile device of the opposite side in the transmission of the image data, cannot be specified.

Figure 2:
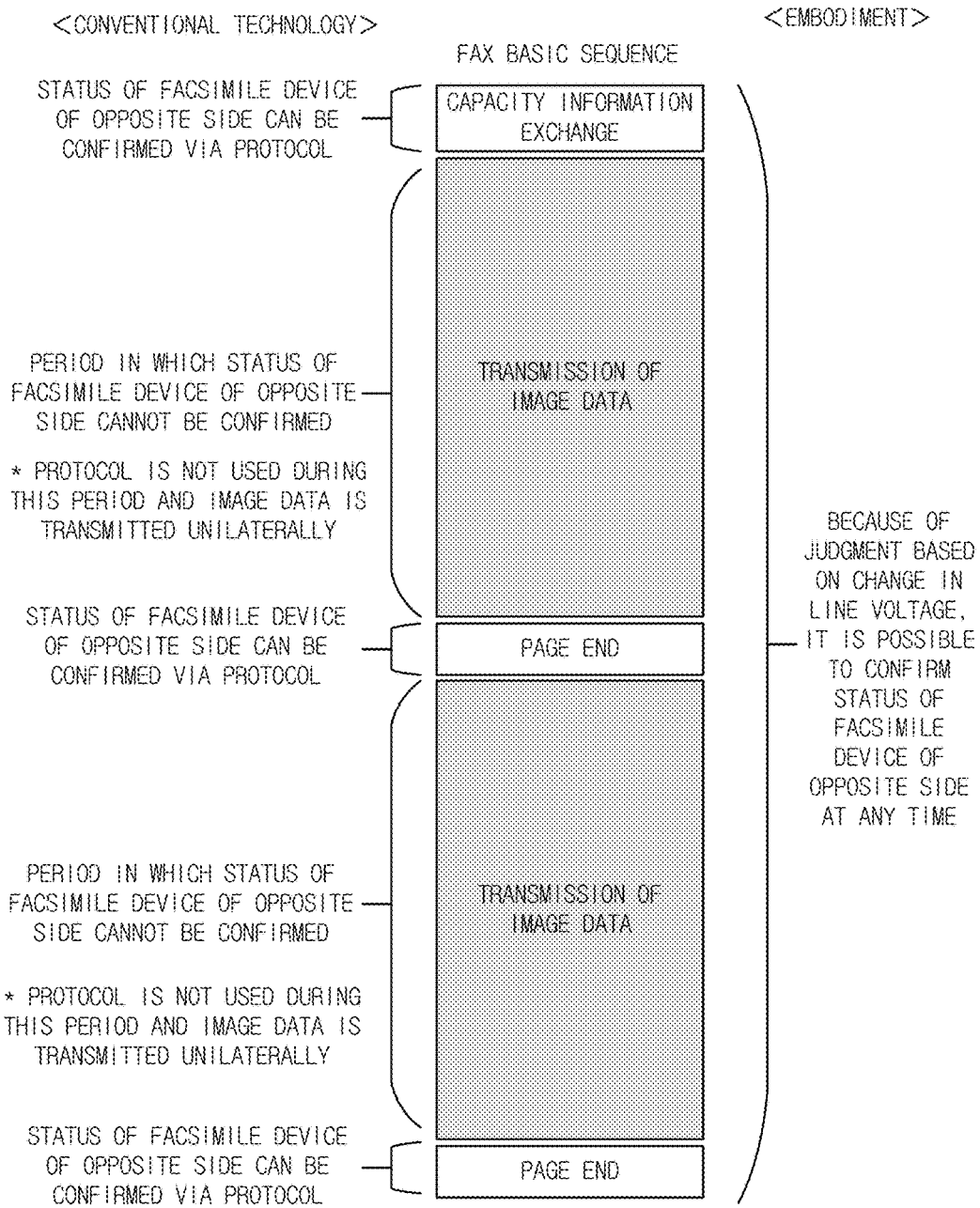
FIG. 2 is a view showing the period in which the transmitter can confirm the open of the line, which is caused in the receiver, by comparing the conventional technology with the first embodiment.

On the other hand, in the facsimile communication device 10 according to this embodiment, because the facsimile communication device 10 recognizes that the facsimile device of the opposite side opens (disconnects) the line in accordance with the change in the line voltage at the predetermined change pattern in the facsimile communication, as shown in the right part of FIG. 2, it is possible to confirm the status of the facsimile device of the opposite side (the open of the line) at any time during the facsimile communication.

In FIG. 1, in the facsimile communication device 10, the CPU (Central Processing Unit) 11 for entirely controlling the facsimile communication device 10 is connected with the ROM 13 (Read Only Memory), the RAM (Random Access Memory) 14, the hard disk drive 15, the nonvolatile memory 16, the image processing unit 17, the scanner unit 21, the printer unit 22, the display unit 23, the operating unit 24, the network I/F (Interface) unit 25, the modem 26 via the bus 12. Further, the DAA (Data Access Arrangement) 28 is connected with the modem 26, and is connected with the line (telephone line) used for the facsimile communication.

The ROM 13 is a read only memory in which various types of programs and the fixed data are stored. By executing the process in accordance with the programs stored in the ROM 13, each function of the facsimile communication device 10 is realized.

The RAM 14 is used as a work memory for temporarily storing various types of data when the programs are executed, an image memory for storing the image data, a buffer memory for the communication, and the like. Further, the RAM 14 functions as the line voltage storing unit 18 for storing the line voltage measured at the predetermined timing, which will be explained below.

The hard disk drive 15 is a large-capacity nonvolatile memory device, and is used for storing application programs, jobs, image data and the like.

The nonvolatile memory 16 is a memory in which the stored contents are maintained even if the facsimile communication device 10 is turned off. In the nonvolatile memory 16, user information, various types of setting information and the like are registered.

The image processing unit 17 executes the process, such as the enlargement/reduction, the resolution conversion, the encoding, the decoding and the like of the image data.

The scanner unit 21 has the function for obtaining image data by optically reading an image of an original. For example, the scanner unit 21 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 22 has the function for printing an image on the recording sheet in accordance with the image data. In this embodiment, the printer unit 22 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The display unit 23 comprises a liquid crystal display and the like, and displays various types of windows, such as the operation window, the setting window and the like. The operating unit 24 comprises various types of buttons, such as a start key, a stop key, a numeric keypad and the like, a touch panel which is provided on the surface of the liquid crystal display and which detects the coordinate position on which the touch panel is pressed, and the like. The operation unit 24 receives various types of operation for the facsimile communication device 10 from a user.

The network I/F unit 25 has the function for communicating with external terminals via the network, such as a LAN (Local Area Network), the Internet and the like. The modem 26 has the function for converting the digital signal to the analog signal and for converting the analog signal to the digital signal. The modem 26 has the function as the tone detection unit 27 and is used for detecting the busy tone and the like.

The DAA 28 has the function as the analog front end for switching the terminal resistance according to the line and the like. Further, the DAA 28 has the function as the line voltage measurement unit 29 for measuring the line voltage. For example, the line voltage measurement unit 29 measures the line voltage at intervals of 200 ms, and stores the measured line voltage in the internal register. The CPU 11 can read out the value of each line voltage, which is stored in the internal register, via the modem 26. Alternatively, the line voltage measurement unit 29 may be configured as an independent circuit.

The CPU 11 has the function as the protocol control unit 31, the line voltage monitoring unit 32, the line voltage storing control unit 33, the voltage change detection unit 34, the judgment unit 35, the communication error specifying unit 36 and the like by executing the programs.

The protocol control unit 31 controls the communication procedure in accordance with the predetermined protocol during the facsimile communication. For example, the protocol control unit 31 controls the communication procedure in accordance with the G3 standard of ITU-T. The line voltage monitoring unit 32 sequentially obtains the line voltage measured by the line voltage measurement unit 29 of the DAA 28 by reading out it from the internal register of the DAA 28. In this embodiment, the line voltage monitoring unit 32 starts obtaining the line voltage after the line capture and before the calling, and obtains the line voltage repeatedly, for example, at intervals of 200 ms during the facsimile communication, that is, until the line is disconnected.

The line voltage storing control unit 33 stores the line voltage (first voltage) which is measured after the line capture and before the calling (dial), and the line voltage (second voltage) which is measured immediately after the facsimile device of the opposite side responds, in the line voltage storing unit 18 (RAM 14).

The voltage change detection unit 34 detects the change in the line voltage at the predetermined change pattern. In detail, after the facsimile device of the opposite side responds, the voltage change detection unit 34 detects the first change in which the line voltage is increased to the first voltage or more and the second change in which the line voltage is changed periodically after the first change.

The judgment unit 35 judges whether the facsimile device of the opposite side opens the line or not in accordance with the predetermined judgment condition including the change in the line voltage, which is detected by the voltage change detection unit 34, and the like.

The communication error specifying unit 36 judges and specifies the type of communication error when the communication error is caused. In particular, the communication error specifying unit 36 specifies the type of communication error by classifying the type of error (error information) according to the timing at which it is judged that the facsimile device of the opposite side opens (disconnects) the line in the facsimile communication procedure.

Figure 3A:
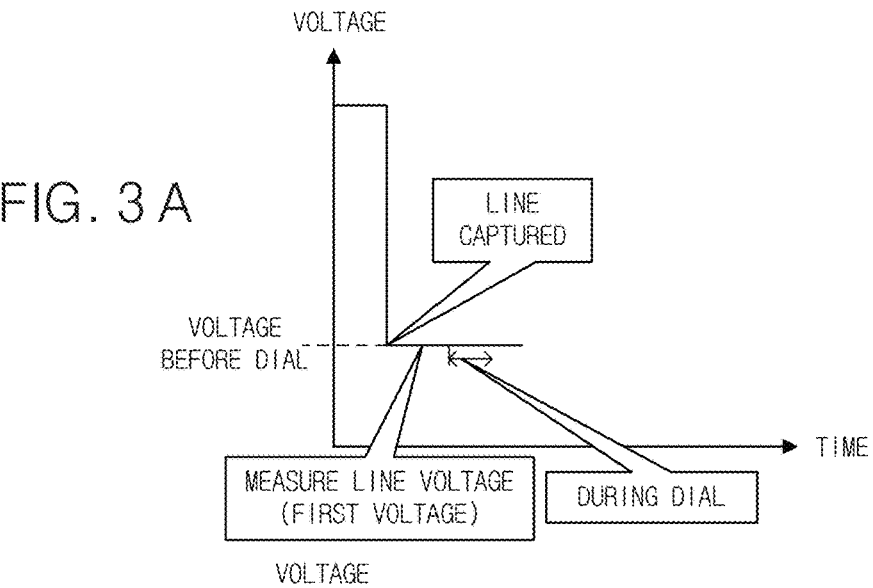
Figure 3B:
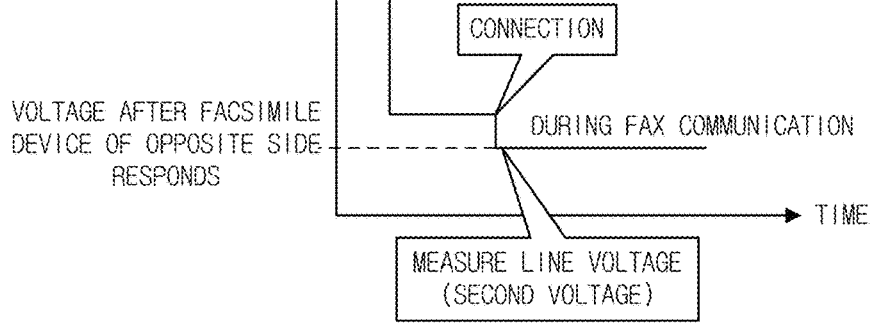
Figure 3C:
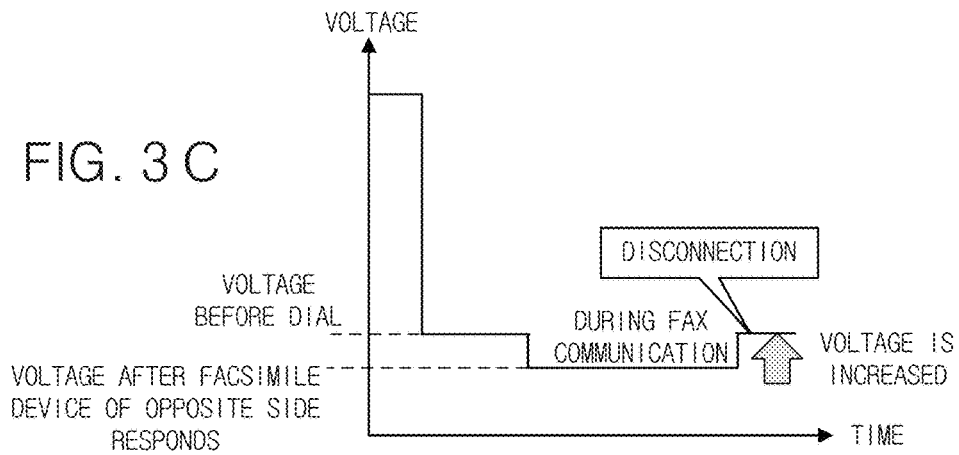

FIGS. 3A to 3C show the ling voltage stored in the line voltage storing unit 18, and the like. When the facsimile communication (transmission) is carried out, the facsimile communication device 10 measures the line voltage after the line capture and before the calling (dial) and stores the measured line voltage in the line voltage storing unit 18 (FIG. 3A). The line voltage which is measured after the line capture and before the calling is referred to as the first voltage. For example, the first voltage is about 6.5 V.

Next, the facsimile communication device 10 measures the line voltage immediately after the facsimile device of the opposite side responds, and stores the measured line voltage in the line voltage storing unit 18 (FIG. 3B). When the facsimile device of the opposite side responds, the line voltage becomes the voltage which is lower than the first voltage which is measured before the calling. The line voltage which is measured after the facsimile device of the opposite side responds is referred to as the second voltage. For example, the second voltage is about 5.5 V.

During the facsimile communication, in case that the facsimile device of the opposite side captures the line, the line voltage is almost maintained at the second voltage. On the other hand, when the facsimile device of the opposite side opens the line, the line voltage is increased from the second voltage (FIG. 3C). The facsimile communication device 10 judges that the facsimile device of the opposite side disconnects (opens) the line in case that the change in the line voltage (the first change) in which the line voltage is increased from the second voltage in the facsimile communication after the facsimile device of the opposite side responds, is detected.

The detection of the first change is one of the judgment conditions for judging that the facsimile device of the opposite side opens the line. In order to certainly judge that the facsimile device of the opposite side opens the line, another condition may be added to the judgment condition. The addition of another condition will be explained below.

In this embodiment, the facsimile communication device 10 judges that the facsimile device of the opposite side opens the line in accordance with the change in the line voltage. Therefore, it is possible to immediately recognize that the facsimile device of the opposite side opens the line at any time during the facsimile communication. Conventionally, it is possible to recognize the open of the line, which is caused in the facsimile device of the opposite side in the period in which only the error information indicating that "the facsimile device of the opposite side does not respond.", is specified. On the other hand, the facsimile communication device 10 can specify the error information (the type of error) in detail as shown in FIG. 4.

Figure 4:
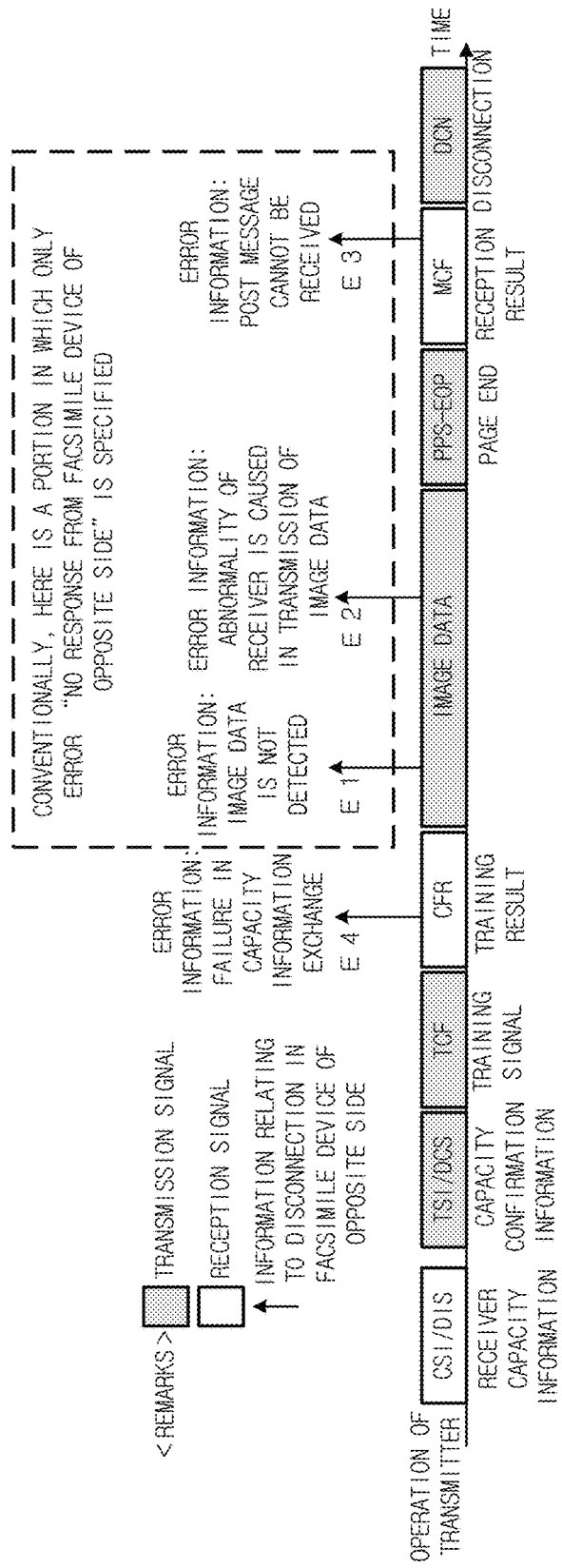
FIG. 4 is an explanatory view showing that the error information is set in detail according to the timing at which the facsimile device of the opposite side disconnects the line.

In detail, in case that the open of the line, which is caused in the facsimile device of the opposite side, is detected immediately after the start of the transmission of the image data, the communication error specifying unit 36 specifies that the facsimile device of the opposite side does not detect the image data, as the error information indicating that "the image data is not detected" (See E1 of FIG. 4).

In case that the open of the line, which is caused in the facsimile device of the opposite side, is detected when or after the predetermined time elapses from the start of the transmission of the image data, the communication error specifying unit 36 specifies that the abnormality is caused in the facsimile device of the opposite side in the transmission of the image data, as the error information indicating "the abnormality of the receiver is caused in the transmission of the image data" (See E2 of FIG. 4). The above predetermined time is, for example, T2 timer (6±1 seconds) in the recommendation T.30.

In case that the open of the line, which is caused in the facsimile device of the opposite side, is detected in the period in which the facsimile communication device 10 waits for the reception of MCF since the post message, such as PPS-EOP or the like, (page end information) is transmitted, the communication error specifying unit 36 specifies that the facsimile device of the opposite side does not receive the post message, as the error information indicating that "the post message cannot be received" (See E3 of FIG. 4).

Further, in case that the open of the line, which is caused in the facsimile device of the opposite side, is detected when the facsimile communication device 10 waits for the reception of the training result after the transmission of the training signal, the communication error specifying unit 36 specifies that the facsimile communication system fails in the capacity information exchange, as the error information indicating "the failure in the capacity information exchange" (See E4 of FIG. 4).

The facsimile communication device 10 displays the above error information on the display unit 23 of the operation panel, or includes the above error information in the communication result report. Alternatively, the facsimile communication device 10 informs a user or an administrator of the error information by being recorded as the communication history.

Figure 5:
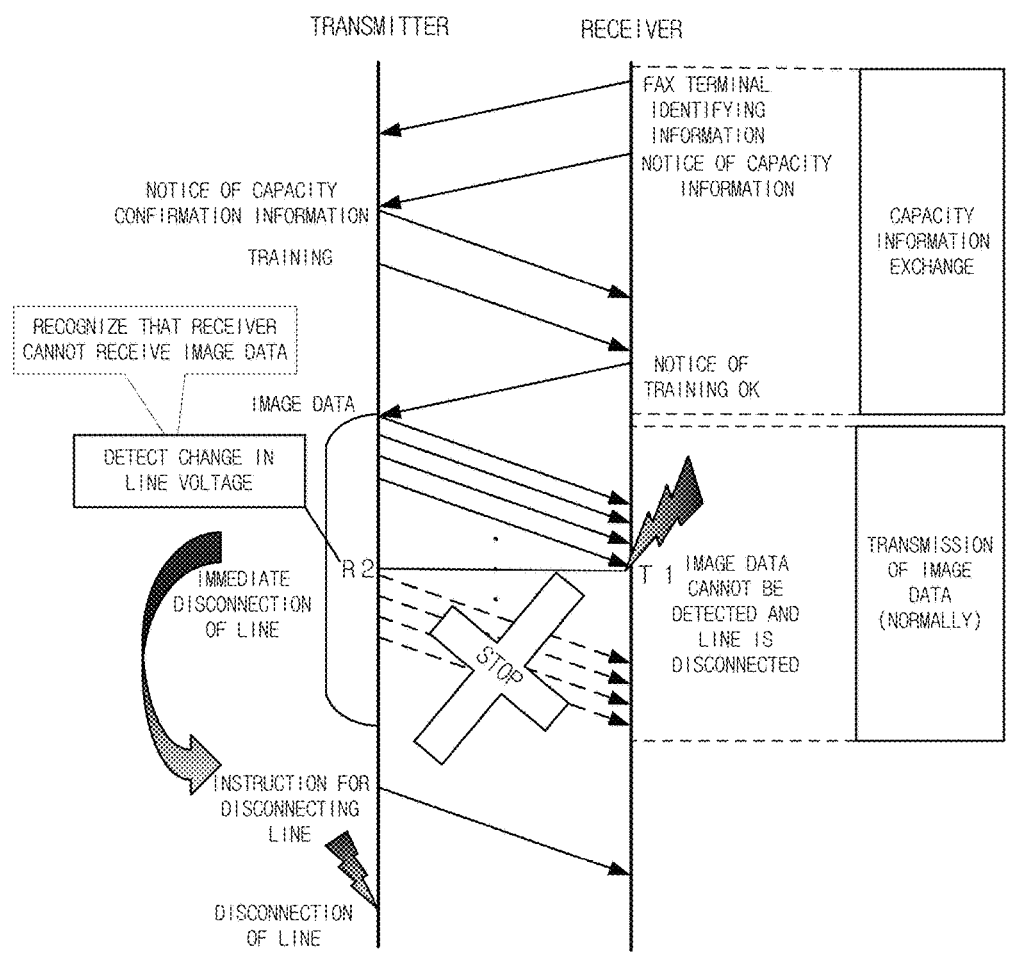
FIG. 5 is a view showing an example of the communication sequence in case that the line voltage is increased to the first voltage or more in the transmission of the image data and the line is disconnected.

FIG. 5 shows an example of the communication sequence in case that the first change in which the line voltage is increased to the first voltage or more in the transmission of the image data is detected and the line is disconnected. In this example, the receiver disconnects the line because the abnormality in which the image data is not detected is caused at time T1. Thereby, the line voltage on the transmitter side is increased to the first voltage or more.

Because the transmitter always monitors the line voltage during the facsimile transmission, the transmitter detects the line voltage which is increased to the first voltage or more, at time R2 immediately after the receiver disconnects the line. Then, the transmitter stops the transmission of the image data, and immediately after the instruction for disconnecting the line is transmitted to the receiver, the transmitter disconnects the line.

Next, the case in which another condition is added to the judgment condition in addition to the detection of the first change in order to certainly judge that the facsimile device of the opposite side opens the line, will be explained.

<Additional Condition (1)>

Figure 6:
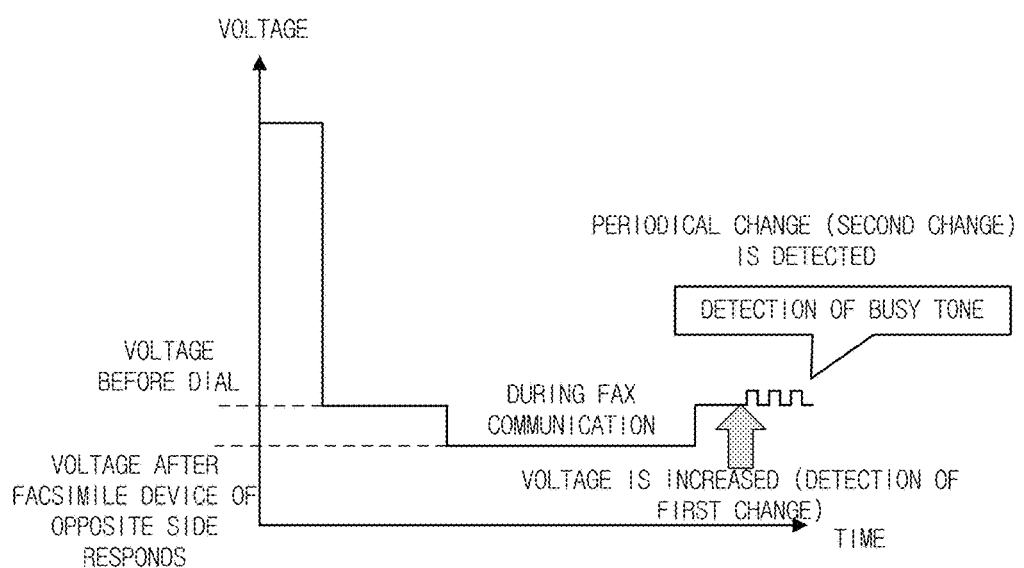
FIG. 6 is a view showing the situation in which the line voltage is periodically changed after the first change is detected.

As shown in FIG. 6, the line voltage monitoring unit 32 continues to monitor the line voltage after the first change in which the line voltage is increased to the first voltage or more in the facsimile communication is detected. The judgment unit 35 judges that the facsimile device of the opposite side opens the line in case that the second change in which the line voltage is changed periodically is detected. The change width in which the line voltage is changed periodically is about 500 mV. By triggering the detection of the first change, the line voltage monitoring unit 32 may monitor the second change.

The periodical change in the line voltage is caused by the busy tone signal transmitted from the TA. Therefore, instead of the detection of the periodical change in the line voltage, the facsimile communication device 10 may detect the busy tone. However, even thought the facsimile device of the opposite side opens the line, the busy tone is not received according to the network. Therefore, the facsimile communication device 10 may judge that the facsimile device of the opposite side opens the line even though the periodical change in the line voltage (second change) is not detected after the first change in which the line voltage is increased to the first voltage or more is detected or even though the busy tone is not detected after the first change is detected, and may disconnect the line immediately.

<Additional Condition (2)>

The judgment according to the additional condition (2) is executed in case that the facsimile communication device 10 cannot certainly judge that the facsimile device of the opposite side disconnects the line according to the above-described additional condition (1). In the judgment according to the additional condition (2), the facsimile communication device 10 executes the communication acknowledgement with the facsimile device of the opposite side. Specifically, when the first change in which the line voltage is increased to the first voltage or more is detected in the transmission of the image data, the facsimile communication device 10 stops the transmission of the image data and transmits the post message (page end information). That is, the facsimile communication device 10 executes the judgment according to the additional condition (2) (communication acknowledgement) by triggering the detection of the first change.

When the facsimile device of the opposite side responds to the post message, the facsimile communication device 10 judges that the facsimile device of the opposite side does not disconnect (open) the line. In case that the facsimile device of the opposite side does not respond, the facsimile communication device 10 judges that the facsimile device of the opposite side disconnects the line.

The frame No. (the information indicating the number of the transmitted frames or the frame number of each frame) to be transmitted in the post message (page end information) is not the frame No. of the frames transmitted until the transmission of the image data is stopped, but the frame No. of the frames to be normally transmitted (the frame No. which will be transmitted in case that the transmission of the image data is continued without stopping the transmission of the image data).

Thereby, in case that the facsimile device of the opposite side does not disconnect the line, the retransmission request indicating the frame No. of each frame which is not normally received by the receiver is transmitted from the receiver. When the transmitter retransmits each frame having the frame No. indicated in the retransmission request, it is possible to continue the transmission of the image data in accordance with the normal communication procedure which is compliant with the G3 standard.

Figure 7:
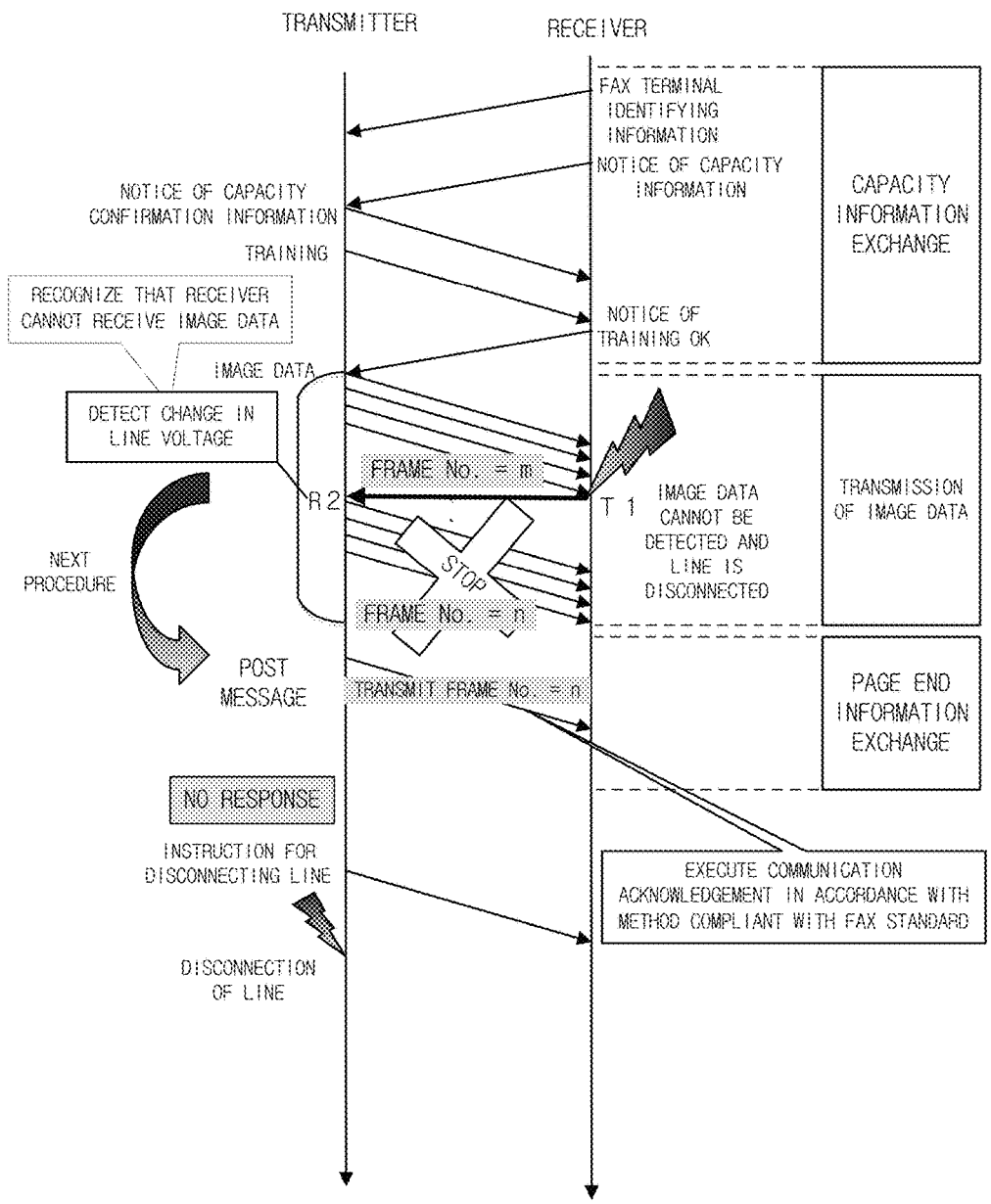
FIG. 7 is a view showing an example of the communication sequence in case that there is no response from the facsimile device of the opposite side in the communication acknowledgement.

FIG. 7 shows an example of the communication sequence in case that the judgment operation is executed according to the additional condition (2) and in case that the first change is detected by the transmitter due to the line disconnection (open), which is caused in the facsimile device of the opposite side. In this example, because the abnormality in which the image data cannot be detected is caused at time T1, the receiver disconnects the line. Thereby, the line voltage on the transmitter side is increased to the first voltage or more.

Because the transmitter always monitors the line voltage during the facsimile communication, the transmitter detects the line voltage which is increased to the first voltage or more, at time R2 immediately after the receiver disconnects the line. The frame No. of the frames which have been already transmitted until this time is m. The transmitter stops the transmission of the image data and executes the communication acknowledgement by transmitting the post message including the frame No. (n) of the frames to be normally transmitted, not the frame No. (m), to the facsimile device of the opposite side.

In case of FIG. 7, because the facsimile device of the opposite side actually disconnects the line, the facsimile device of the opposite side does not respond to the post message. Therefore, the transmitter transmits the instruction for disconnecting the line to the receiver and disconnects the line.

Figure 8:
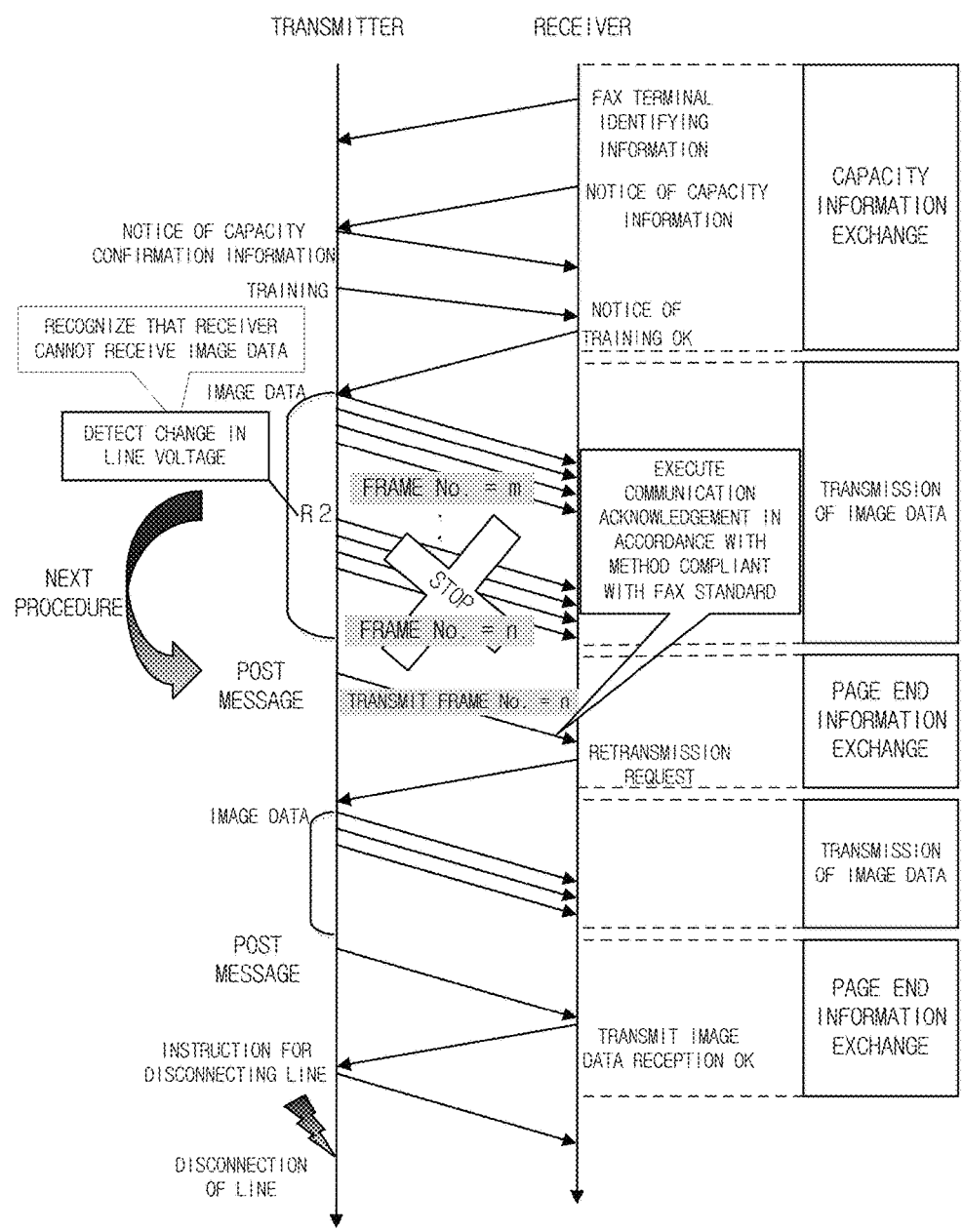
FIG. 8 is a view showing an example of the communication sequence in case that the response is received from the facsimile device of the opposite side in the communication acknowledgement.

FIG. 8 shows an example of the communication sequence in case that the judgment operation is executed according to the additional condition (2) and in case that the first change is detected by the transmitter for some reason even though the facsimile device of the opposite side does not disconnect the line.

In this example, the receiver does not disconnect the line, but the transmitter detects the first change in which the line voltage is increased to the first voltage or more, at time R2. The frame No. of the frames which have been already transmitted until this time is m. The transmitter stops the transmission of the image data and executes the communication acknowledgement by transmitting the post message including the frame No. (n) of the frames to be normally transmitted, not the frame No. (m), to the facsimile device of the opposite side.

In the example of FIG. 8, because the facsimile device of the opposite side continues to capture the line and to execute the communication, when the facsimile device of the opposite side receives the post message, the facsimile device of the opposite side transmits the retransmission request. That is, because the receiver receives only the frames having the frame No. (1) to the frame No. (m) even though the frame No. included in the post message is n, the receiver transmits the retransmission request indicating the frame No. of each frame which is not normally received, to the transmitter, as the response to the post message including the frame No. (n).

When the transmitter receives the retransmission request from the receiver, the transmitter retransmits each frame having the frame No. indicated in the retransmission request, to the facsimile device of the opposite side. Because the subsequent procedure of this example is the same as that of a normal case, the explanation of the subsequent procedure is omitted.

Next, the detection of the busy tone will be supplementally explained.

In case that the detection of the busy tone is executed in the transmission of the signals, because the transmitted signal is overlapped with the busy tone, the frequency and the level of the busy tone to be detected are unknown. Therefore, by previously executing the test mode or the like, the frequency and the level of the busy tone to be detected are measured. By inputting the suitable parameters to the tone detection unit 27, the false detection is avoided.

Figure 9:
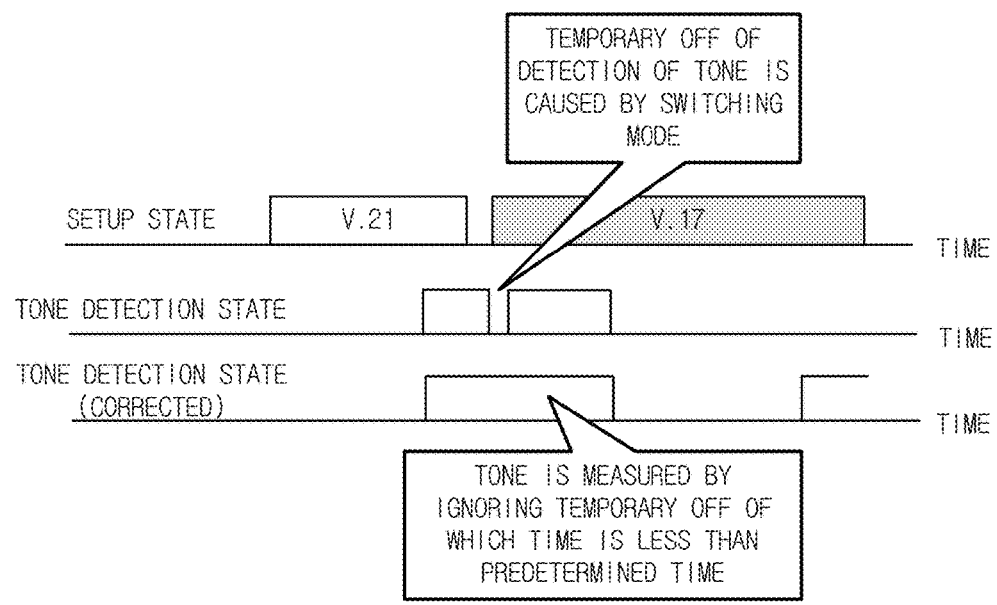
FIG. 9 is a view for explaining the correction in which the temporary OFF of the tone detection, which is caused when the mode of the modem is switched, is ignored.

Further, as shown in FIG. 9, when the setup state (mode) of the modem 26 is changed from V21 to V17, the detection of the tone is temporarily off.

For example, it is assumed that the disconnection of the line, which is caused in the facsimile device of the opposite side is certainly judged by detecting the busy tone three successive times after the first change is caused (the additional condition (1) is added). In this assumption, in case that the detection of the tone is temporarily off by switching the above mode while the busy tone is detected at the Nth time (N is 3 or less), the facsimile communication device 10 resets the detection of the busy tone and it is necessary to count the detection of the busy tone from the beginning. As a result, the additional time for certainly judging the disconnection of the line, which is caused in the facsimile device of the opposite side is required, and the disconnection of the line, which is executed by the transmitter is delayed.

Therefore, in this embodiment, in case that the mode of the modem 26 is switched when the busy tone is detected after the first change is caused, as shown in FIG. 9, the facsimile communication device 10 ignores the temporary off of the detection of the tone, which is caused by switching the mode of the modem 26. Then, the facsimile communication device 10 continues to detect the busy tone and to count the detection of the busy tone by ignoring the temporary off.

Figure 10:
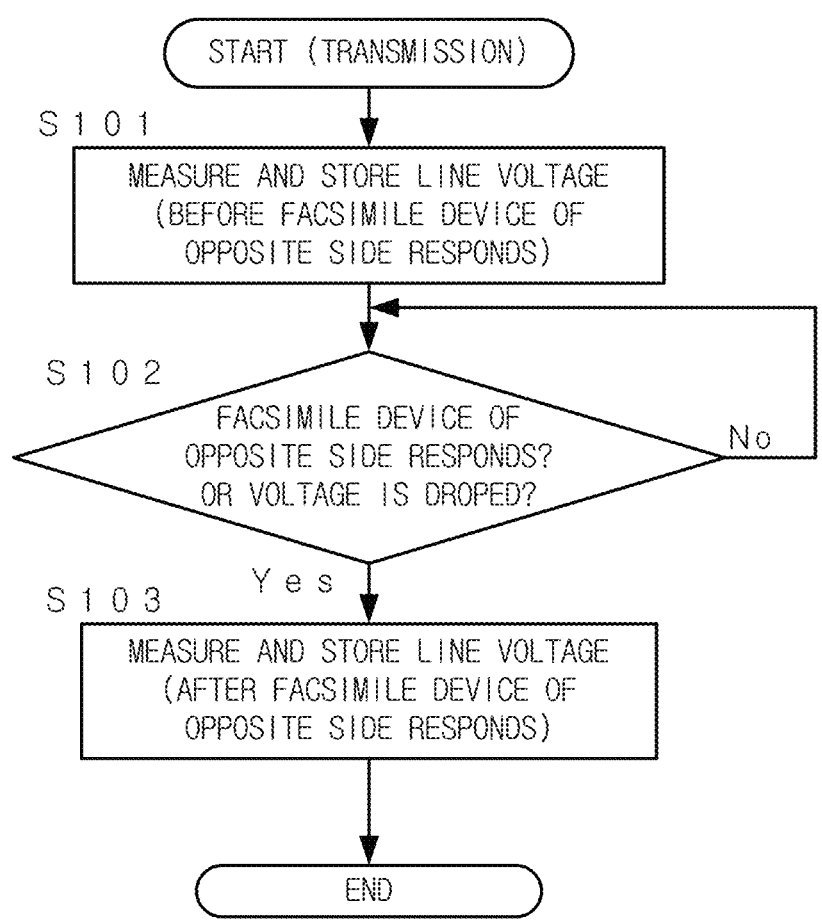
FIG. 10 is a flowchart showing the process which is carried out by the facsimile communication device when the first voltage and the second voltage are measured and stored in the line voltage storing unit.

FIG. 10 is a flowchart showing the process which is carried out by the facsimile communication device 10 when the first voltage and the second voltage are measured and stored in the line voltage storing unit 18. When the facsimile communication device 10 captures the line in order to execute the facsimile communication, the facsimile communication device 10 measures the line voltage before the dial and stores the measured line voltage as the first voltage in the line voltage storing unit 18 (Step S101). Then, the facsimile communication device 10 executes the dial and waits for the response from the facsimile device of the opposite side (the drop of the line voltage) (Step S102; No). When the facsimile device of the opposite side responds (the line voltage is dropped) (Step S102; Yes), the facsimile communication device 10 measures the line voltage and stores the measured line voltage as the second voltage in the line voltage storing unit 18 (Step S103).

Figure 11:
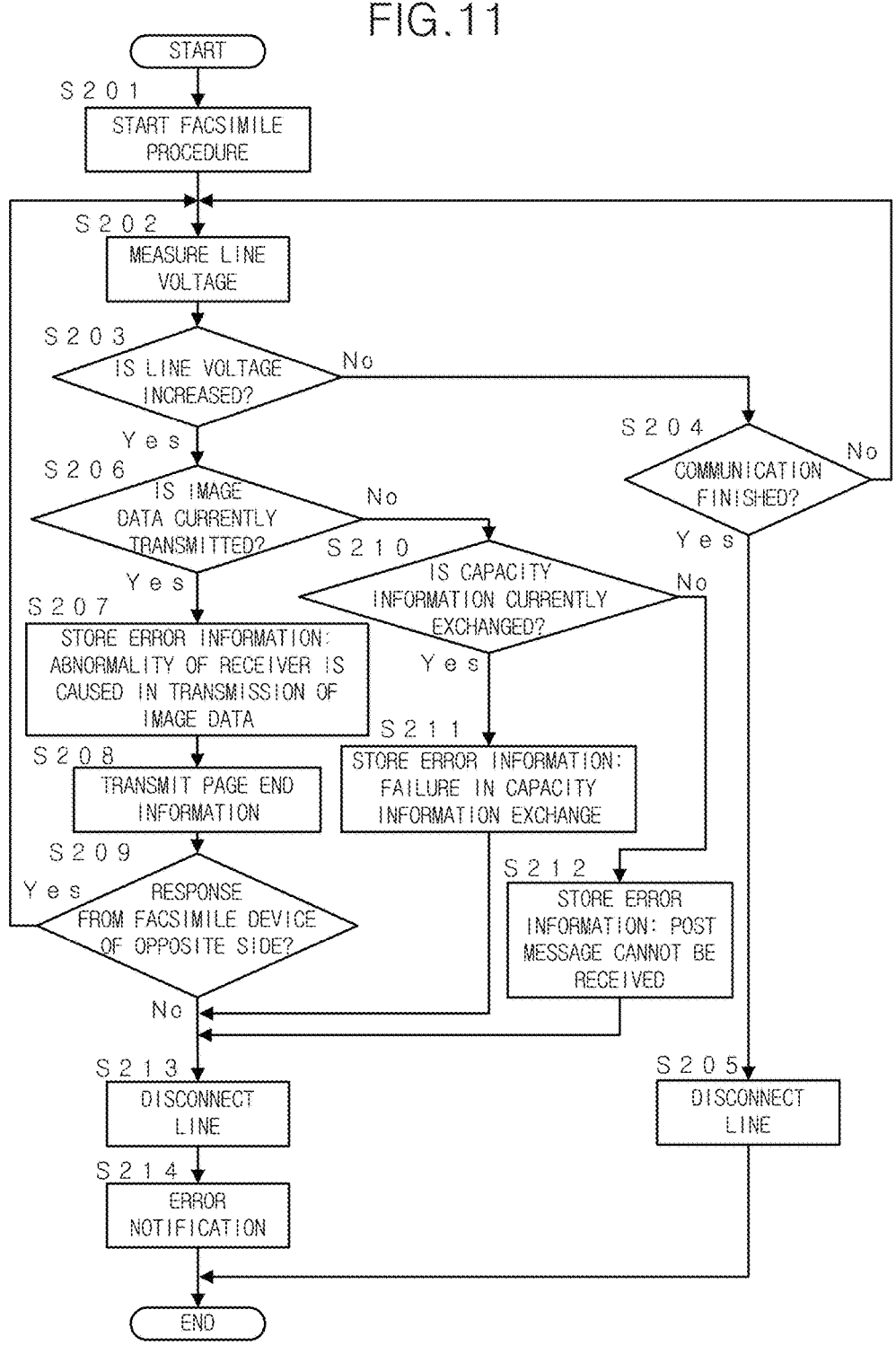
FIG. 11 is a flowchart showing the process relating to the monitoring of the open of the line, which is caused in the facsimile device of the opposite side, the process being carried out by the facsimile communication device during the facsimile communication.

FIG. 11 is a flowchart showing the process relating to the monitoring of the open of the line, which is caused by the facsimile device of the opposite side. This process is carried out by the facsimile communication device 10 during the facsimile communication. After the facsimile communication is started in accordance with the protocol (Step S201), the facsimile communication device 10 repeatedly measures the line voltage (Step S202). The facsimile communication device 10 judges whether the measured line voltage is increased from the second voltage (Step S203).

When the line voltage measured in Step S202 is not increased from the second voltage (Step S203; No), the facsimile communication device 10 checks whether the communication is finished or not (Step S204). In case that the communication is not finished (Step S204; No), the process is continued by returning to Step S202. In case that the communication is finished (Step S204; Yes), the facsimile communication device 10 disconnects the line (Step S205). Then, the process is ended.

When the line voltage measured in Step S202 is increased from the voltage (Step S203; Yes), the facsimile communication device 10 checks the current position (timing) on the facsimile procedure, and specifies the error information according to the current position on the facsimile procedure. In detail, in case that the image data is currently transmitted in the facsimile procedure (Step S206; Yes), the facsimile communication device 10 specifies that "the abnormality of the receiver is caused in the transmission of the image data" as the error information (E2 of FIG. 4), and stores the error information (Step S207). Then, the facsimile communication device 10 transmits the post message to the facsimile device of the opposite side (Step S208) and waits for the response from the facsimile device of the opposite side.

When the response (retransmission request) is received from the facsimile device of the opposite side (Step S209; Yes), the facsimile communication device 10 continues the process by returning to Step S202. In case that the response is not received from the facsimile device of the opposite side (Step S209; No), the facsimile communication device 10 disconnects the line (Step S213), and notifies a user of the error by using the display unit 23 of the operation panel or the like (Step S214). Then, the process is ended.

In case that the capacity information is currently exchanged in the facsimile procedure (Step S206; No and Step S210; Yes), the facsimile communication device 10 specifies "the failure in the capacity information exchange" as the error information (E4 of FIG. 4), and stores the error information (Step S211). The facsimile communication device 10 disconnects the line (Step S213), and notifies a user of the error (Step S214). Then, the process is ended.

In case that the capacity information is not currently exchanged in the facsimile procedure (Step S210; No), the facsimile communication device 10 specifies that "the post message cannot be received" as the error information (E3 of FIG. 4), and stores the error information (Step S212). The facsimile communication device 10 disconnects the line (Step S213), and notifies a user of the error (Step S214). Then, the process is ended.

As described above, in this embodiment, the facsimile communication device 10 judges whether the facsimile device of the opposite side disconnects the line or not in accordance with the change in the line voltage during the facsimile communication. Therefore, it is possible to immediately detect the disconnection (open) of the line, which is caused in the facsimile device of the opposite side, at any time during the facsimile communication without depending on the facsimile communication procedure.

Figure 12:
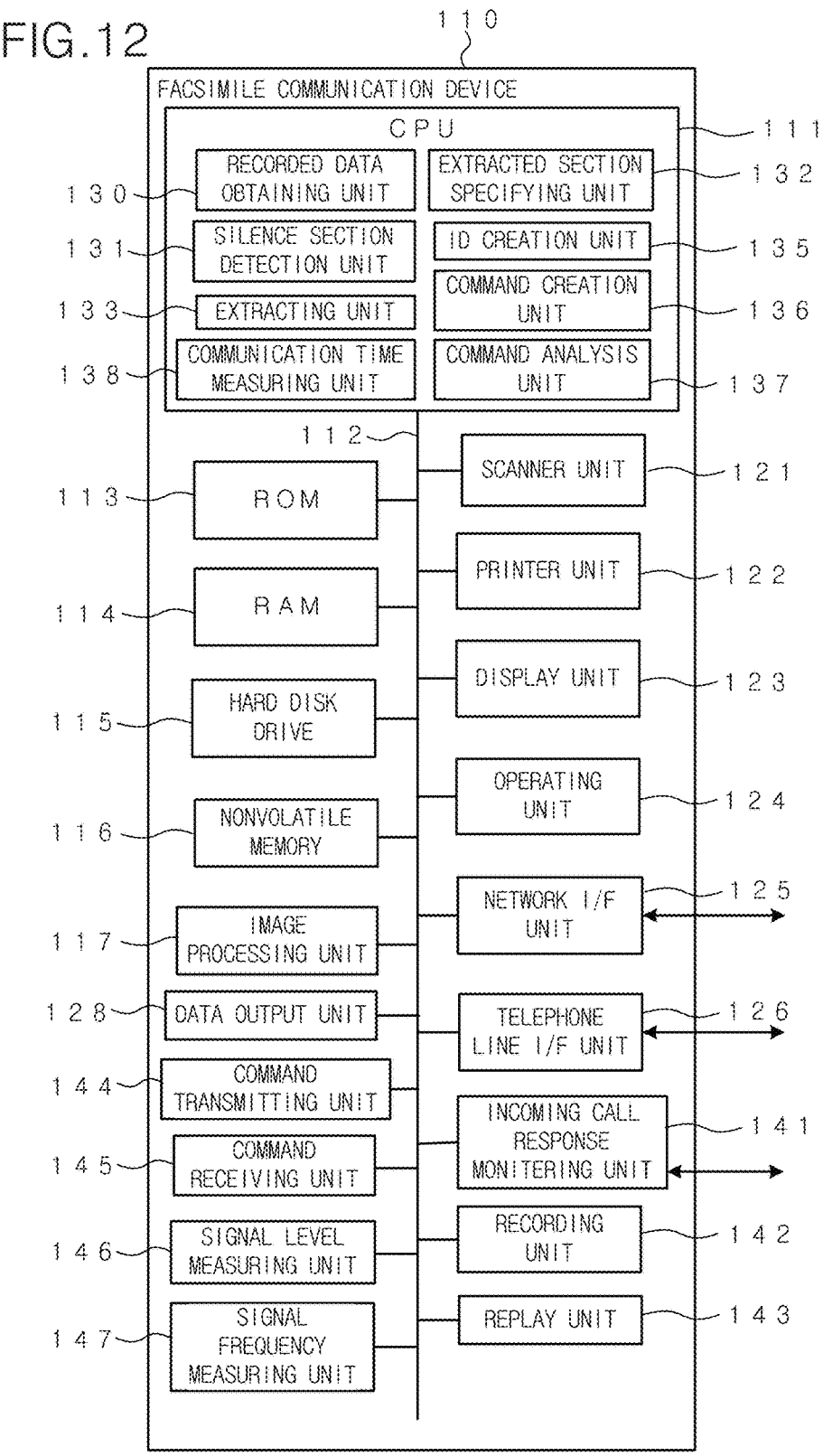
FIG. 12 is a block diagram showing the schematic configuration of the facsimile communication device having the function of the communication disturbance analysis device according to the second embodiment.

Second Embodiment:

FIG. 12 is a block diagram showing the schematic configuration of the facsimile communication device 110 having the function of the communication disturbance analysis device according to the second embodiment. The facsimile communication device 110 is connected with another facsimile communication device 110 via the communication line including the digital line and the analog line.

The facsimile communication device 110 has the function for recoding the communication sound on the telephone line. The communication disturbance analysis device obtains the recorded data of the transmitter and the recorded data of the receiver in one facsimile communication, and detects the silence section included in the recorded data. Then, the facsimile communication device specifies the part which is effective for the analysis of the communication disturbance (the extracted section which is extracted as the recorded data to be analyzed) among the long recorded data from the start of the communication to the finish of the communication in accordance with the detected silence section, and extracts the recorded data of the extracted section. Thereby, an operator who analyzes the disturbance can analyze the cause of the disturbance by listening to the extracted recorded data, and the like. Further, it is possible to reduce the work for analyzing the disturbance as compared with the case in which the whole of the enormous original recorded data is analyzed.

As shown in FIG. 12, the facsimile communication device 110 comprises a CPU (Central Processing Unit) 111 for entirely controlling the operation of the facsimile communication device 110. The CPU 111 is connected with a ROM (Read Only Memory) 113, a RAM (Random Access Memory) 114, a hard disk drive 115, a nonvolatile memory 116, an image processing unit 117, a scanner unit 121, a printer unit 122, a display unit 123, an operating unit 124, a network I/F unit 125, a telephone line I/F unit 126 and a data output unit 128 via a bus 112.

Further, the facsimile communication device 110 has the incoming call response monitoring unit 141, the recording unit 142, the replay unit 143, the command transmitting unit 144, the command receiving unit 145, the signal level measuring unit 146 and the signal frequency measuring unit 147.

The ROM 113 is a read only memory in which various types of programs and the fixed data are stored. By executing the process in accordance with the programs stored in the ROM 113 by the CPU 111, each function of the facsimile communication device 110 is realized. The RAM 114 is used as a work memory for temporarily storing various types of data when the programs are executed by the CPU 111, an image memory for storing the image data, a buffer memory for the communication, and the like.

The hard disk drive 115 is a large-capacity nonvolatile memory device, and is used for storing or temporarily storing jobs to be executed, other image data to be transmitted, image data received from another facsimile communication device 110 and the like. Further, the hard disk drive 115 is used for storing the recorded data of the communication sound.

The nonvolatile memory 116 is a memory in which the stored contents are maintained even if the facsimile communication device 110 is turned off. In the nonvolatile memory 116, user information, various types of setting information and the like are registered.

The image processing unit 117 executes the process, such as the enlargement/reduction, the resolution conversion, the encoding, the decoding and the like of the image data.

The scanner unit 121 has the function for obtaining image data by optically reading an image of an original. For example, the scanner unit 121 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 122 has the function for printing an image on the recording sheet in accordance with the image data. In this embodiment, the printer unit 122 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The display unit 123 comprises a liquid crystal display and the like, and displays various types of windows, such as the operation window, the setting window and the like. The operating unit 124 comprises various types of buttons, such as a start key, a stop key, a numeric keypad and the like, a touch panel which is provided on the surface of the liquid crystal display and which detects the coordinate position on which the touch panel is pressed, and the like. The operation unit 124 receives various types of operation for the facsimile communication device 110 from a user.

The network I/F unit 125 has the function for communicating with external terminals via the network, such as a LAN (Local Area Network), the Internet and the like. The telephone line I/F unit 126 has the function for connecting with the telephone network for the facsimile communication. The telephone line I/F unit 126 comprises a modem, a tone detection unit, a DAA (Data Access Arrangement) and the like.

The CPU 111 has the function as the recorded data obtaining unit 130, the silence section detection unit 131, the extracted section specifying unit 132, the extracting unit 133, the ID creation unit 135, the command creation unit 136, the command analysis unit 137, the communication time measuring unit 138 and the like.

The incoming call response monitoring unit 141 detects the off-hook of the telephone line in case that the facsimile communication device 110 is a receiver.

The ID creation unit 135 creates the ID (identification information) related to the job when the record instruction command is created.

The command creation unit 136 creates the record instruction command including the ID created by the ID creation unit 135, or the replay instruction command including the optional ID.

The command transmitting unit 144 transmits the command by using the signal, such as DTMF or the like.

The recording unit 142 records the communication sound on the telephone line by fetching the sound from a modular jack neighborhood circuit or a speaker circuit.

The replay unit 143 replays the digitalized sound data by converting it to the analog sound.

The command receiving unit 145 receives the command from the facsimile device of the opposite side.

The command analysis unit 137 analyzes the command received by the command receiving unit 145 and obtains the instruction contents of the command and the ID.

The signal level measuring unit 146 measures the signal level of the signal having the specific frequency from the voltage, the current and the like of the telephone line.

The signal frequency measuring unit 147 measures the frequency of the communication sound on the telephone line. In this embodiment, the signal frequency measuring unit 147 measures the frequency of the signal having the specific frequency by using the band-pass filter and the like.

The communication time measuring unit 138 detects the off-hook and the on-hook, and measures the elapsed time from the start of the communication (on-hook).

The recorded data obtaining unit 130 obtains the recorded data to be analyzed. When the facsimile communication device 110 is the transmitter, the recorded data obtaining unit 130 obtains the recorded data of the receiver. On the other hand, when the facsimile communication device 110 is the receiver, the recorded data obtaining unit 130 obtains the recorded data of the transmitter. Alternatively, in case that the communication to be analyzed is carried out between the facsimile communication devices except the facsimile communication device 110, the recorded data obtaining unit 130 obtains both the recorded data of the transmitter in the above communication and the recorded data of the receiver in the above communication.

The silence section detection unit 131 detects the silence section included in the recorded data which is recorded during the facsimile communication. The extracted section specifying unit 132 specifies the section to be extracted as the recorded data to be analyzed, from the recorded data of the transmitter in one communication and the recorded data of the receiver in the above one communication, respectively, in accordance with the silence section detected by the silence section detection unit 131. The extracting unit 133 extracts the recorded data corresponding to the extracted section specified by the extracted section specifying unit 132. The data output unit 128 outputs the extracted recorded data to an external device.

The communication disturbance analysis device corresponds to the portion including the recorded data obtaining unit 130, the silence section detection unit 131, the extracted section specifying unit 132, the extracting unit 133, the replay unit 143, the signal level measuring unit 146, the signal frequency measuring unit 147, the communication time measuring unit 138 and the data output unit 128. In FIG. 12, the facsimile communication device 110 includes the function of the communication disturbance analysis device. However, the communication disturbance analysis device may be a device which is independent from the facsimile communication device 110.

Figure 13:
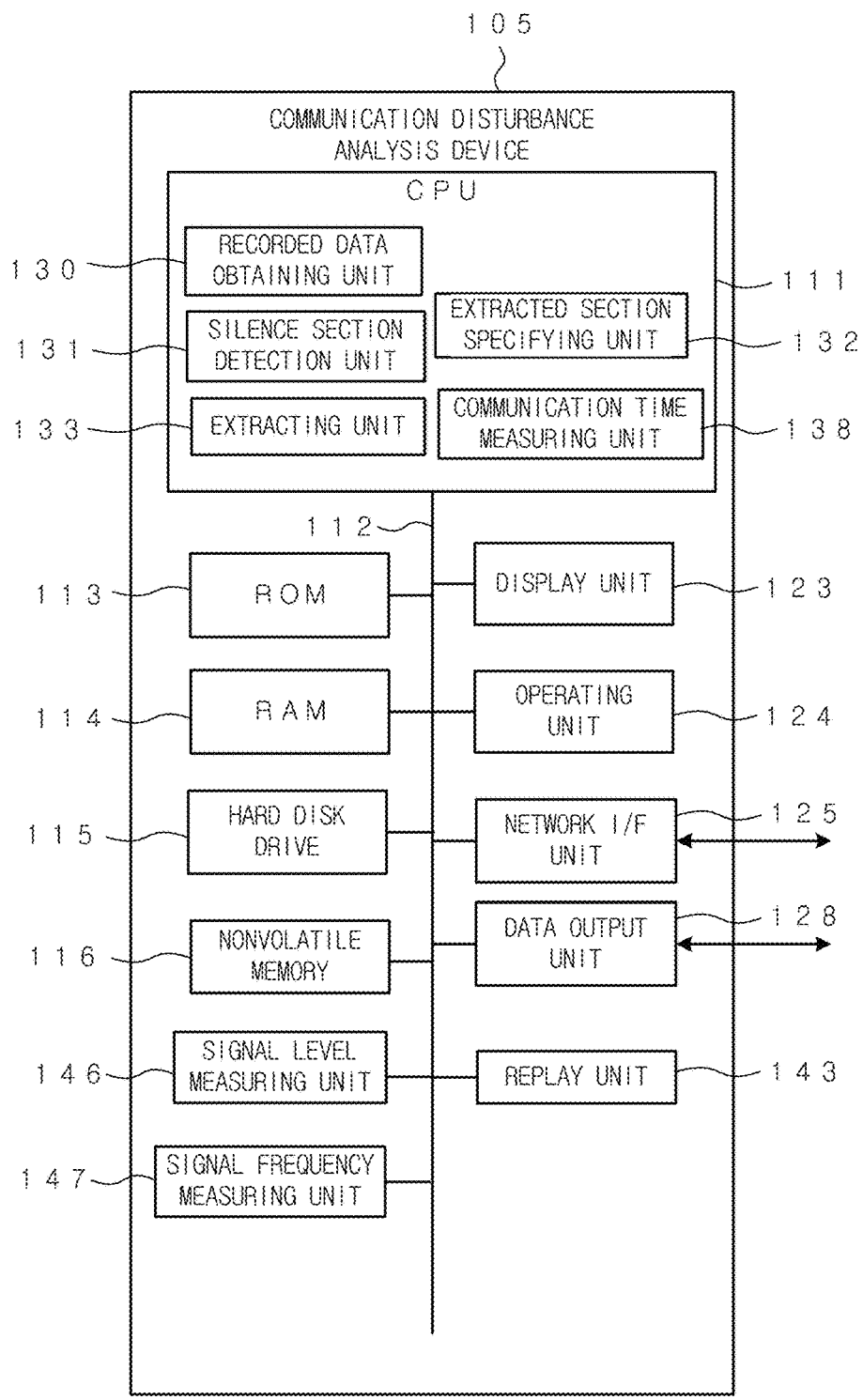
FIG. 13 is a block diagram showing the schematic configuration of the communication disturbance analysis device as an independent device.

FIG. 13 is a block diagram showing the schematic configuration of the communication disturbance analysis device 105 as an independent device. The elements having the same functions as those of the facsimile communication device 110 are denoted by the same numeral references, and the explanation thereof is omitted. Alternatively, the computer program may cause an information processing device to function as the communication disturbance analysis device 105.

<Recording Operation>

The facsimile communication device 110 which functions as the transmitter, creates the ID which is unique to the current facsimile communication job by using the ID creation unit 135. The command creation unit 136 creates the record instruction command including the created ID. The command transmitting unit 144 of the transmitter transmits the record instruction command to the receiver at the start of the facsimile communication or immediately after the start of the facsimile communication. For example, the command transmitting unit 144 transmits the record instruction command by using the DTMF immediately after the receiver carries out the off-hook operation. The facsimile communication device 110 which functions as the transmitter, starts the record from the off-hook operation, and finishes the record at the on-hook operation. The recorded data is stored so as to relate the recorded data to the ID.

The facsimile communication device 110 which functions as the receiver, starts the record when the receiver is called and carries out the off-hook operation. Further, the facsimile communication device 110 which functions as the receiver, records the communication sound during the communication, and finishes the record at the on-hook operation. The command receiving unit 145 of the receiver receives the above-described command transmitted by the transmitter. The command analysis unit 137 analyzes the received command to specify the ID and the contents of the command. Then, the recorded data is stored so as to relate the recorded data to the ID. In case that the above-described command is not received even though the predetermined time elapses from the off-hook, the receiver stops the record and discards the recorded data which is recorded during the current communication.

<Example of Failed Communication>

Figure 14:
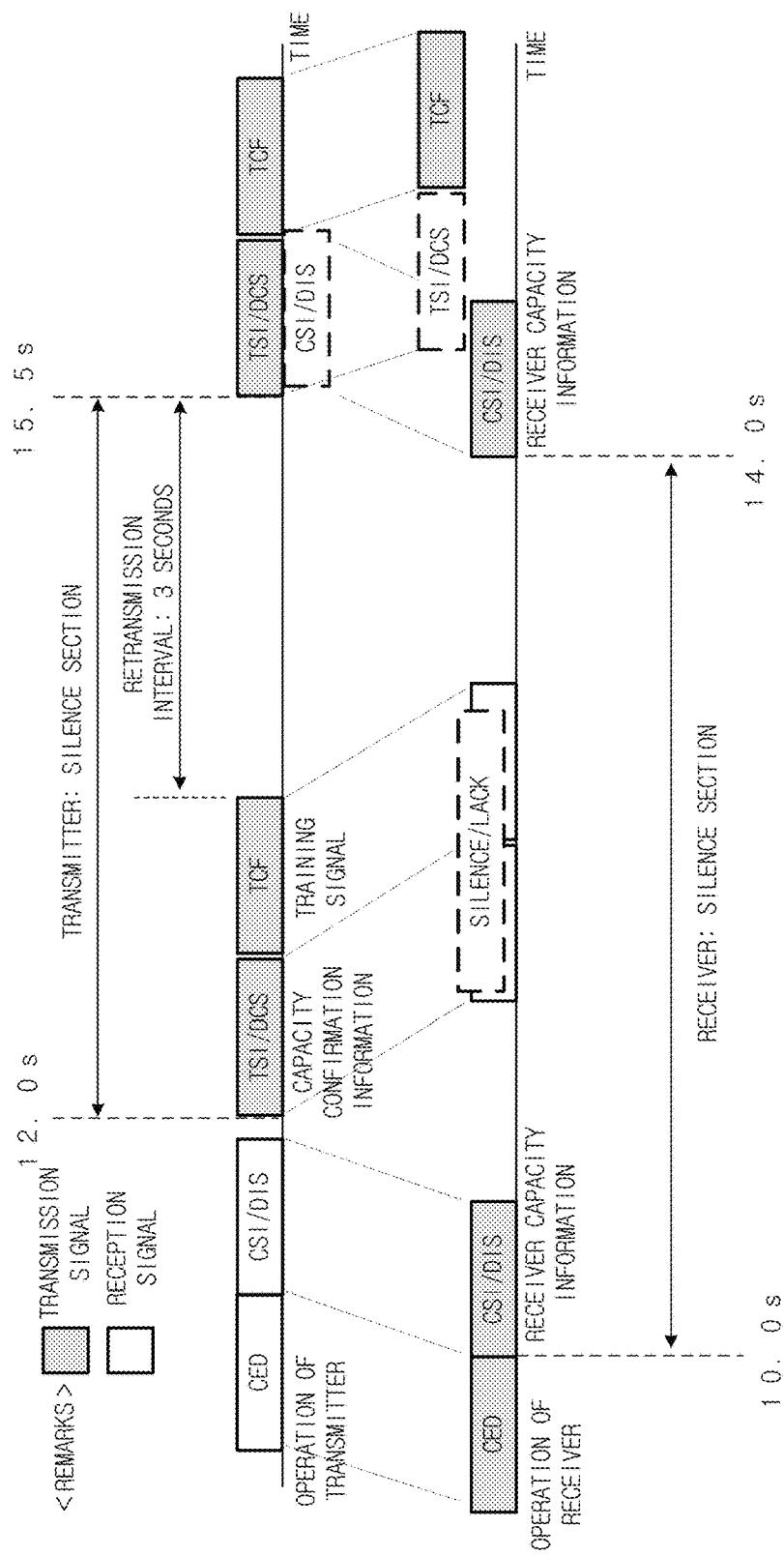
FIG. 14 is a view showing an example of the communication sequence in case that the lack of the signal is caused.

FIG. 14 shows an example of the communication sequence in case that the lack of the signal is caused. In this example, because the lack of TSI/DCS (capacity confirmation information) transmitted by the transmitter or the delay in TSI/DCS is caused in the transmission of TSI/DCS via the IP telephone network, the receiver retransmits CSI/DIS (receiver capacity information). Further, because the transmitter cannot receive CSI/DIS (receiver capacity information) within the predetermined time (retransmission interval: 3 seconds) since the transmitter transmits TSI/DCS (capacity confirmation information), the transmitter retransmits TSI/DCS (capacity confirmation information). In the following explanation, the case in which the recorded data obtained in the communication shown in FIG. 14 is analyzed, will be described.

<Operation of Communication Disturbance Analysis Device>

Firstly, the recorded data of the transmitter and the recorded data of the receiver, which are related to the same ID, are obtained. An optional method for obtaining the recorded data may be used. For example, each facsimile communication device 110 uploads the recorded data to the predetermined server. The communication disturbance analysis device 105 obtains the recoded data of the transmitter and the recorded data of the receiver, which are related to the same ID, from the server by downloading them. Alternatively, one facsimile communication device 110 transmits the request command (including the ID) for obtaining the recorded data, to the facsimile device of the opposite side, and the facsimile device of the opposite side transmits the recorded data which is related to the ID included in the request command.

The silence section detection unit 131 detects the silence section from each recorded data. In this example, the timing of the off-hook operation is set to the reference point (time 0), and the generation timing of the signal having the predetermined signal level or more and the predetermined frequency is measured to specify the silence section.

Basically, after the specific control signal is detected in the facsimile communication procedure, in case that the retransmission of the same specific control signal is detected, the period from the first detection of the specific control signal to the detection of the retransmitted specific control signal (the second detection of the specific control signal) is detected as the silence section.

In this example, the specific control signal is detected in accordance with the signal level and the signal frequency. That is, the signal level of the control signal transmitted from one facsimile communication device is higher than the signal level of the signal received from the facsimile device of the opposite side in the recorded data recorded in the above one facsimile communication device. Therefore, it is judged that the signal having the signal level which is higher than the predetermined threshold value is the control signal transmitted from the facsimile communication device in which the communication sound is recorded. Then, in case that the facsimile communication device in which the communication sound is recorded successively transmits the same control signal, it is judged that the above control signal is retransmitted. The type of the control signal is judged in accordance with the frequency thereof.

In detail, in case that the signal frequency measuring unit 147 judges that the frequency of the first signal having the signal level higher than the predetermined level, which is detected by the signal level measuring unit 146, is the specific frequency, the first signal is recognized as the specific control signal. After the first signal is detected, in case that the signal frequency measuring unit 147 judges that the frequency of the second signal having the signal level higher than the predetermined level, which is detected by the signal level measuring unit 146, is the specific frequency, the second signal is recognized as the retransmitted specific control signal. Then, the period from the detection of the first signal to the detection of the second signal is detected as the silence section.

In the example of FIG. 14, (1) the transmitter measures the waveform of TSI/DCS (capacity confirmation information) as the signal having the predetermined level/frequency (control signal). In FIG. 14, the transmitter detects the above control signal at the point of 12.0 s and the point of 15.5 s, and does not detect the control signal having the signal level higher than the predetermined level between the point of 12.0 s and the point of 15.5 s. The point of 12.0 s at which the first TSI/DCS signal is detected is set to the start timing (the starting point) of the silence section. The point of 15.5 s at which the second TSI/DCS signal is detected is set to the end timing (the ending point) of the silence section. These timings are stored so as to relate the timings to the predetermined ID created by the transmitter.

(2) The receiver measures the waveform of CSI/DIS (receiver capacity information) as the signal having the predetermined level/frequency (control signal). In FIG. 14, the receiver detects the above control signal at the point of 10.0 s and the point of 14.0 s, and does not detect the control signal having the signal level higher than the predetermined level between the point of 10.0 s and the point of 14.0 s. The point of 10.0 s at which the first CSI/DIS signal is detected is set to the start timing (the starting point) of the silence section. The point of 14.0 s at which the second TSI/DCS signal is detected is set to the end timing (the ending point) of the silence section. These timings are stored so as to relate the timings to the ID transmitted from the transmitter at the start of the communication or the like. By the ID, the recorded data of the transmitter in one facsimile communication is related to the recorded data of the receiver in the above one facsimile communication.

Figure 15:
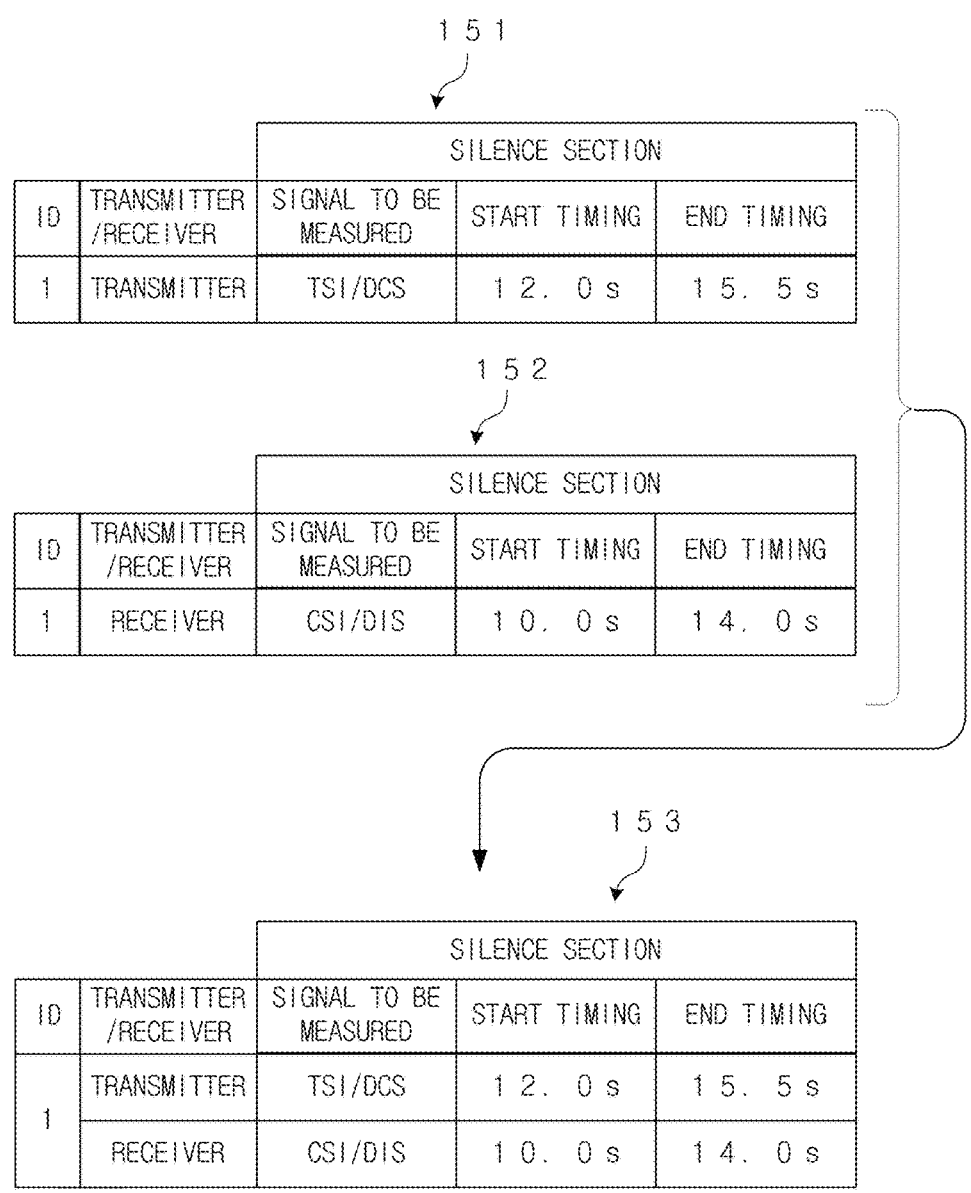
FIG. 15 is a view showing the table in which the information relating to the detected silence section is registered.

FIG. 15 shows the table in which the information relating to the detected silence section is registered. The first table 151 in which the information relating to the start timing and the end timing of the silence section detected in the transmitter by the above process (1) is registered, is prepared. The second table 152 in which the information relating to the start timing and the end timing of the silence section detected in the receiver by the above process (2) is registered, is prepared. Then, by integrating the first table 151 and the second table 152, the third table 153 is prepared.

Next, the extracted section specifying unit 132 specifies the extracted section. In the method for specifying the extracted section, firstly, the extracted section specifying unit 132 confirms the overlapped part of the silence section detected in the transmitter and the silence section detected in the receiver. In case of the example of FIG. 14 and FIG. 15, the period from the point of 12.0 s to the point of 14.0 s is the overlapped part.

Figure 17:
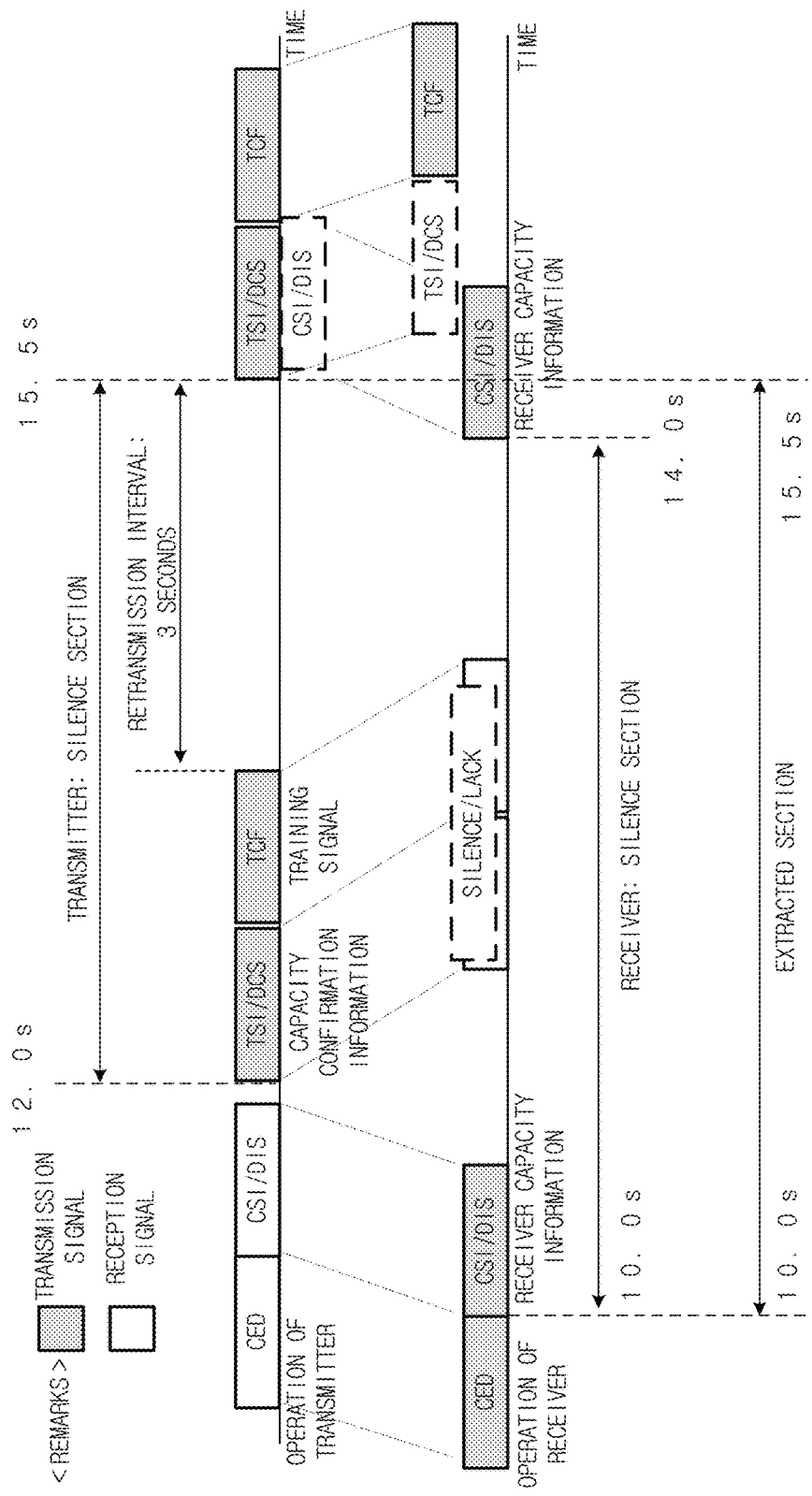
FIG. 17 is a view showing the extracted section which is specified in accordance with the predetermined standard in the communication sequence.

In case that the silence section detected in the transmitter is overlapped with the silence section detected in the receiver, the extracted section specifying unit 132 sets the earlier of the start timing of the silence section detected in the transmitter and the start timing of the silence section detected in the receiver, to the start timing of the extracted section. Further, the extracted section specifying unit 132 sets the later of the end timing of the silence section detected in the transmitter and the end timing of the silence section detected in the receiver, to the end timing of the extracted section. Thereby, the extracted section specifying unit 132 determines the extracted section. Then, the extracted section specifying unit 132 additionally registers the time information relating to the extracted section in the third table 153 (in the row "Reset") (See FIG. 16). FIG. 17 shows the extracted section in the communication sequence. In this example, the start timing of the extracted section is 10.0 s and the end timing of the extracted section is 15.5 s.

The extracting unit 133 extracts the recorded data corresponding to the extracted section from both of the recorded data of the transmitter and the recorded data of the receiver. Then, the extracted recorded data is stored or is output to an external device.

As described above, because the part which is effective for the analysis of the communication disturbance is automatically detected and extracted among the long recorded data from the start of the communication to the finish of the communication, by analyzing the extracted recorded data, it is possible to reduce the work for analyzing the disturbance as compared with the case in which the whole of the enormous original recorded data is analyzed.

Further, because the starting point of the extracted recorded data of the transmitter is coincident with the starting point of the extracted recorded data of the receiver, for example, in the example, both of the starting points are 10.0 s from the off-hook as the reference point, it is possible to easily synchronize the communication sounds in the part which is the cause of the disturbance and to easily compare the recorded data by simultaneously replaying both of the recorded data from the starting point.

Figure 18:
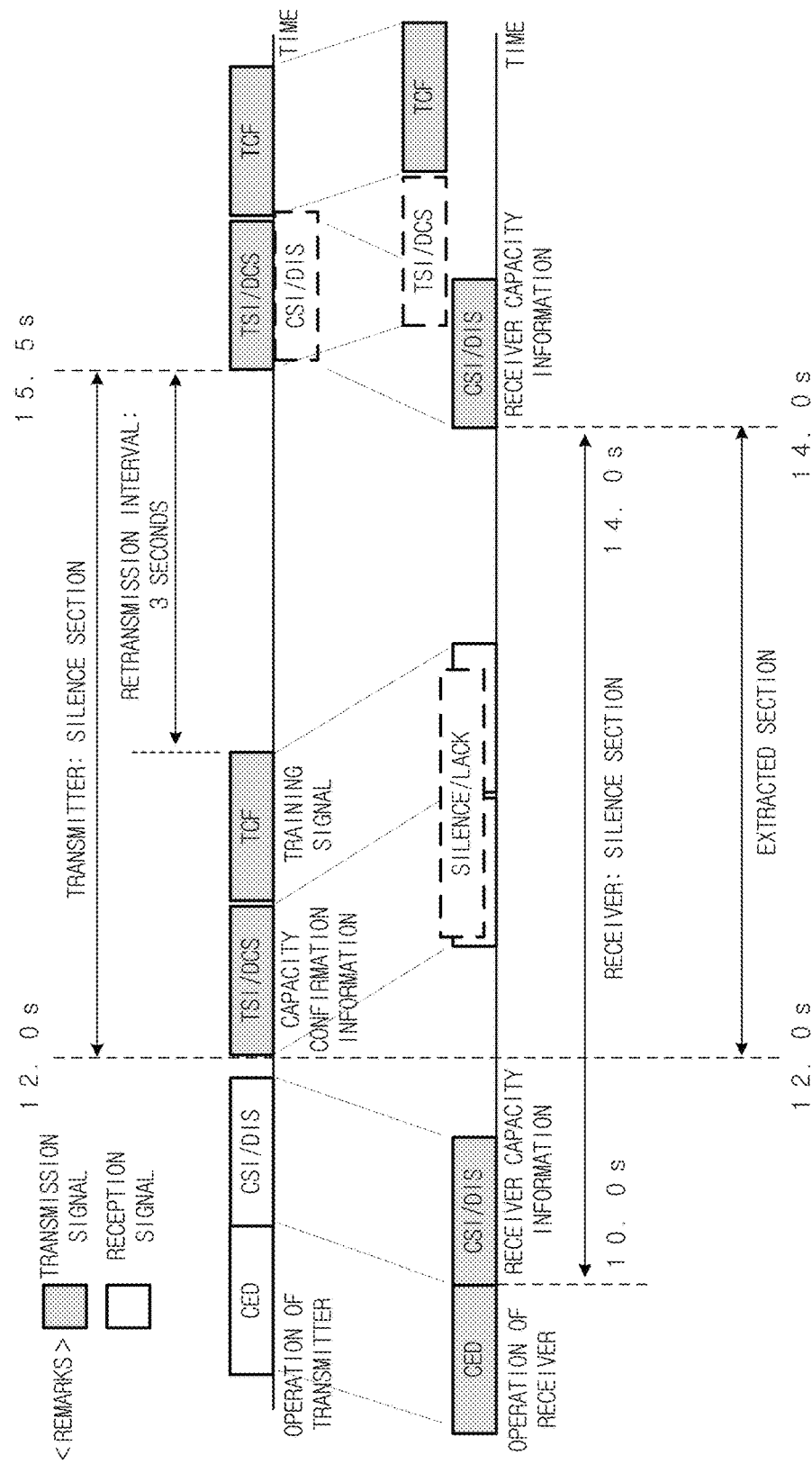
FIG. 18 is a view showing the extracted section which is specified in accordance with another standard in the communication sequence.

FIG. 18 and FIG. 19 show an example in which the extracted section is specified in accordance with another standard. Like the above-described example, firstly, the extracted section specifying unit 132 confirms the overlapped part of the silence section detected in the transmitter and the silence section detected in the receiver.

In case that the silence section detected in the transmitter is overlapped with the silence section detected in the receiver, the extracted section specifying unit 132 sets the later of the start timing of the silence section detected in the transmitter and the start timing of the silence section detected in the receiver, to the start timing of the extracted section. Further, the extracted section specifying unit 132 sets the earlier of the end timing of the silence section detected in the transmitter and the end timing of the silence section detected in the receiver, to the end timing of the extracted section. Thereby, the extracted section specifying unit 132 determines the extracted section. Then, the extracted section specifying unit 132 additionally registers the time information relating to the extracted section in the third table 153 (in the row "Reset") (See FIG. 19). FIG. 18 shows the extracted section in the communication sequence. In this example, the start timing of the extracted section is 12.0 s and the end timing of the extracted section is 14.0 s.

The extracting unit 133 extracts the recorded data corresponding to the extracted section from both of the recorded data of the transmitter and the recorded data of the receiver. Then, the extracted recorded data is stored or is output to an external device.

In addition, in case that the control signal transmitted from one of the transmitter and the receiver at the starting point of the silence section is not detected from the recorded data which is recorded in the other of the transmitter and the receiver, the period from the transmission of the above control signal to the transmission of another control signal from the other of the transmitter and the receiver after the transmission of the above control signal, is specified as the extracted section. For example, in case that the control signal (referred to as "first control signal") transmitted from the transmitter at the starting point of the silence section detected in the transmitter is not detected from the recorded data which is recorded in the receiver, the timing at which the transmitter transmits the first control signal is set to the start timing (the starting point) of the extracted section. Further, the timing at which the receiver transmits the control signal (referred to as "second control signal") after the transmitter transmits the first control signal (the timing at which the second control signal is detected from the recorded data of the receiver), is set to the end timing (the ending point) of the extracted section. Thereby, the period from the starting timing to the ending timing is specified as the extracted section.

In the example of FIG. 18 and FIG. 19, it is judged whether the control signal transmitted from the receiver is detected from the recorded data of the transmitter. In the example of FIG. 18, it is checked whether the CSI/DIS signal transmitted from the receiver at the point of 10.0 s is detected from the recorded data of the transmitter. In this example, it is judged whether the CSI/DIS signal is recorded from the point of 10.0 s to the point of 12.0 s in the recorded data of the transmitter by using the signal level measuring unit 146 and the signal frequency measuring unit 147. In the example of FIG. 18, because the CSI/DIS signal is detected in the period from 10.0 s to 12.0 s from the recorded data of the transmitter, this period is not specified as the extracted section.

Next, it is judged whether the control signal transmitted from the transmitter is detected from the recorded data of the receiver. In the example of FIG. 18, it is checked whether the TSI/DCS signal transmitted from the transmitter at the point of 12.0 s is detected from the recorded data of the receiver. In this example, it is judged whether the TSI/DCS signal is recorded from the point of 12.0 s to the point of 14.0 s in the recorded data of the receiver by using the signal level measuring unit 146 and the signal frequency measuring unit 147. In the example, of FIG. 18, the signal having the predetermined level/frequency is not detected in the period from 12.0 s to 14.0 s. That is, the TSI/DCS signal does not reach the receiver and is lacked. Therefore, the period from the point of 12.0 s at which the transmitter transmits the TSI/DCS signal to the point of 14.0 s at which the receiver transmits the CSI/DIS signal is specified as the extracted section, and the recorded data corresponding to the extracted section is extracted.

Next, the extension of the extracted section will be explained. The extracted section which is specified as shown in FIG. 16 and FIG. 17, is the minimum section. Therefore, there are some cases in which the cause of the disturbance is analyzed more easily if the recorded data which is recorded in the vicinity of the specified extracted section is added. In this example, the extracted section is extended by the predetermined time. For example, the timing calculated by subtracting 0.5 second from the start timing of the original extracted section is set to the start timing of the extended extracted section. Further, the timing calculated by adding 1.0 second to the end timing of the original extracted section is set to the end timing of the extended extracted section. FIG. 20 shows the third table 153 in which the extended extracted section is additionally registered.

Figure 21:
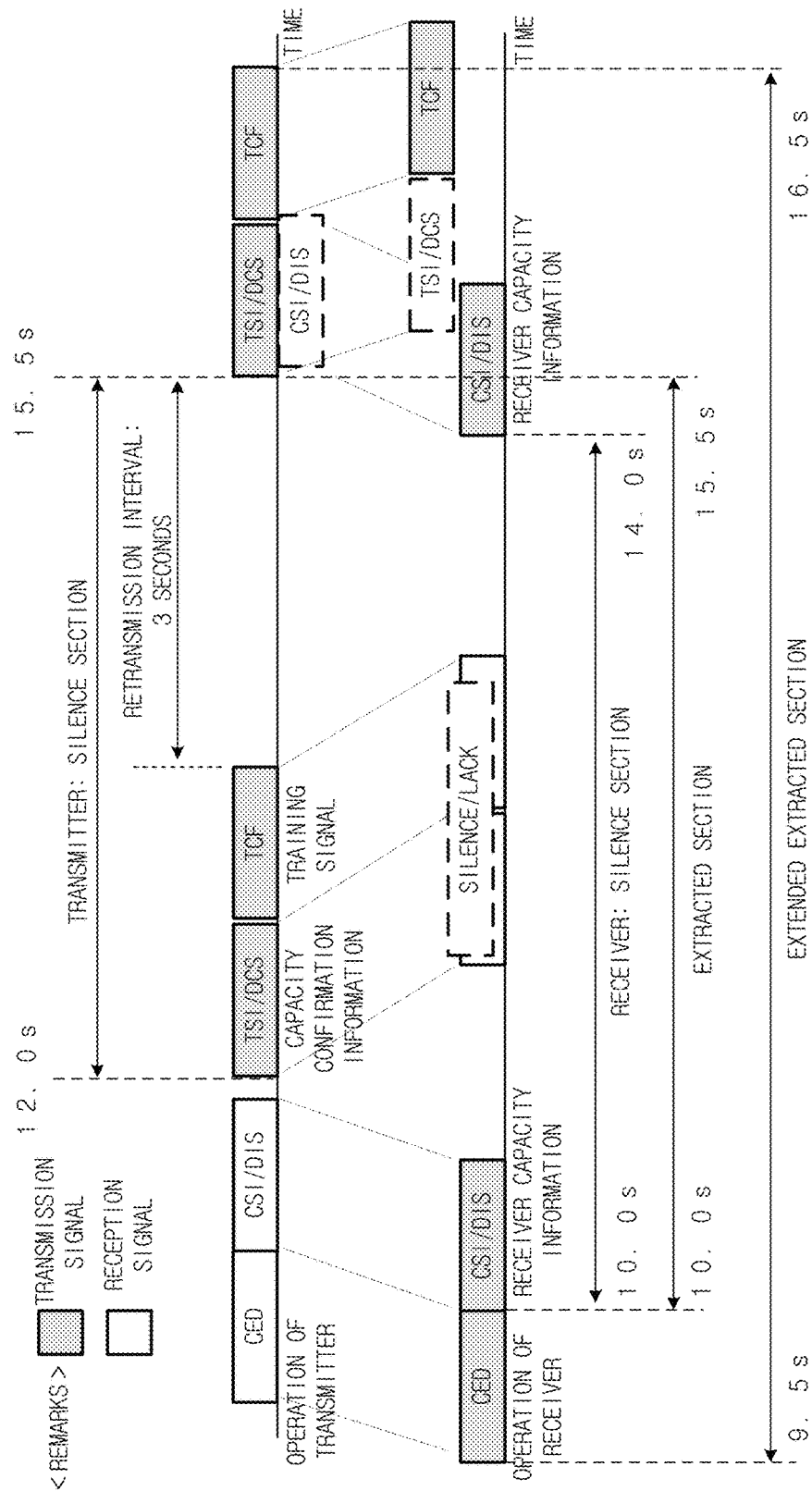
FIG. 21 is a view showing the extracted section which is extended so as to include the control signals transmitted in the vicinity of the extracted section in the communication sequence.

Alternatively, the original extracted section is extended so as to include the control signals transmitted in the vicinity of the original extracted section. For example, as shown in FIG. 21, in case that the start timing (10.0 s) of the original extracted section is the timing of the detection of the CSI/DIS signal transmitted from the receiver, the start timing of the extended extracted section is shifted to the timing of the detection of the CED signal which is the control signal preceding the CSI/DIS signal. Further, in case that the end timing (15.5 s) of the original extracted section is the timing immediately before the retransmission of the TSI/DCS signal, the end timing of the extended extracted section is shifted afterward to the finish of the retransmission of the TSI/DCS signal. By including the control signals transmitted in the vicinity of the original extracted section in the recorded data as described above, it is possible to easily grasp the position in the recorded data for the communication. Thereby, an operator is assisted to analyze the disturbance.

The situation in which the control signal is retransmitted due to the delay in the signal or the lack of the signal is repeated in one communication. Therefore, there is some possibility that the silence section which is caused between the same control signals is detected a plurality of times from the recorded data in one communication. In this case, if the recorded data corresponding to any one of the silence sections is extracted, the problem relating to the analysis of the disturbance is not caused.

As shown in FIG. 22, in case that the silence section extracted in accordance with the same control signals is detected a plurality of times in one communication, one silent section is selected from the detected silence sections and the other silence sections are discarded. In the example of FIG. 22, the silence section which is caused for the first time is selected among the detected silence sections, and the silence sections which are caused for the second or subsequent times are discarded.

As shown in FIG. 23, there are some cases in which the line is disconnected in the communication due to the on-hook operation carried out by a user. In the example of FIG. 23, after the receiver transmits the CSI/DIS signal, the line is disconnected by carrying out the on-hook operation while the receiver waits for the TSI/DCS signal transmitted from the facsimile device of the opposite side.

Normally, because the CSI/DIS signal is retransmitted due to the lack of the TSI/DCS signal, the period from the first transmission of the CSI/DIS signal to the second transmission of the CSI/DIS signal is detected as the silence section. However, when the on-hook operation is carried out before the second transmission of the CSI/DIS signal, the silence section cannot be detected by the method for detecting the silence section as described above. Therefore, in case that after the specific control signal (for example, the CSI/DIS signal) is detected, the on-hook operation (line disconnection) is detected before the control signal to be output next in the facsimile communication procedure (in this case, the TSI/DCS signal to be transmitted from the facsimile device of the opposite side) is detected, the period from the detection of the specific control signal to the on-hook operation is detected as the silence section. Further, in the transmitter, when the transmitter detects the line disconnection, the period from the transmission of the control signal which is transmitted before the line disconnection, to the line disconnection, is detected as the silence section. In this example, the receiver detects the period from the point of 10.0 s to the point of 13.5 s as the silence section, and the transmitter detects the period from the point of 12.0 s to the point of 13.5 s as the silence section.

Figure 24:
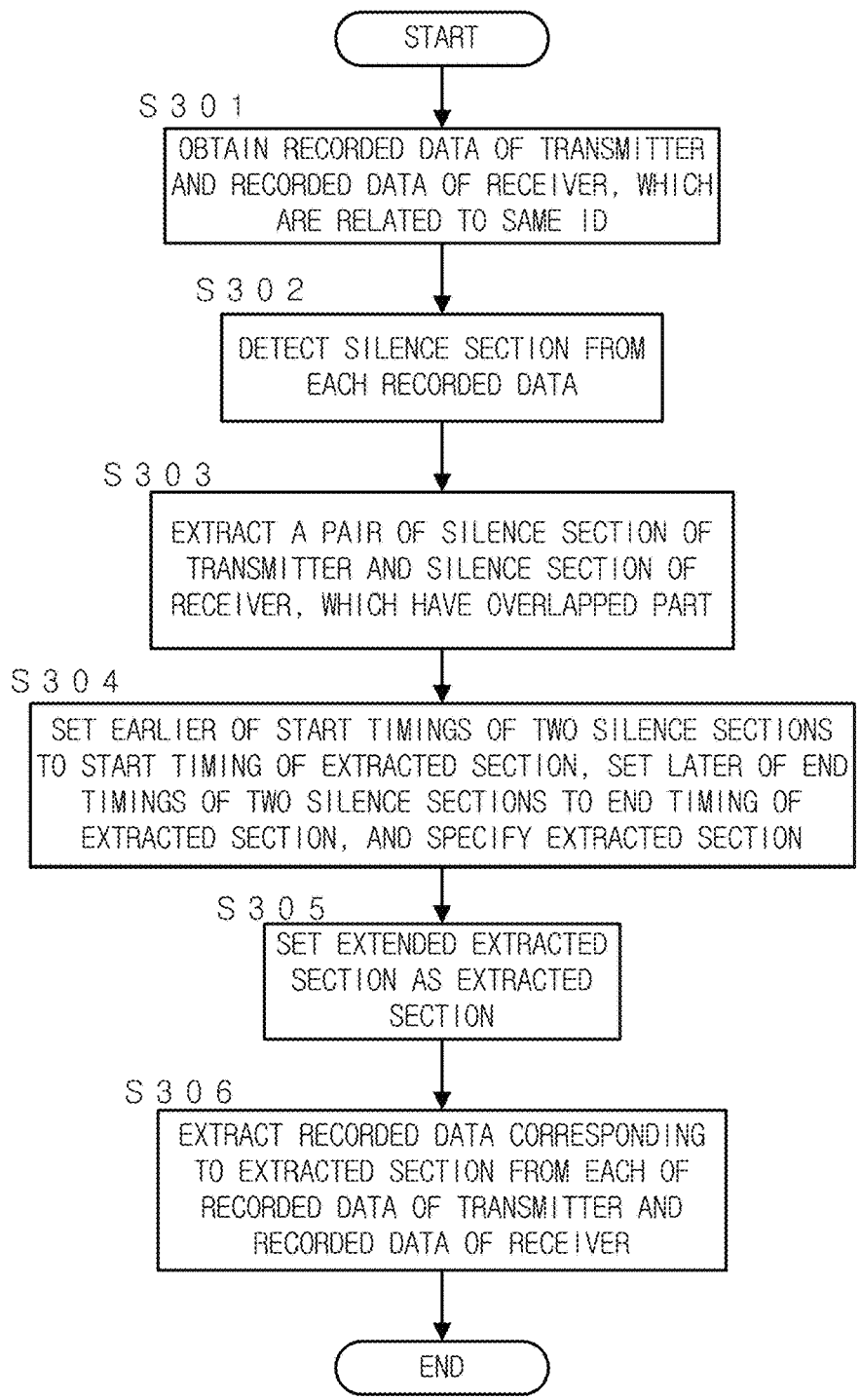
FIG. 24 is a flowchart showing the process for specifying the extracted section, which is carried out by the communication disturbance analysis device (or the communication disturbance analysis device included in the facsimile communication device)
Figure 25:
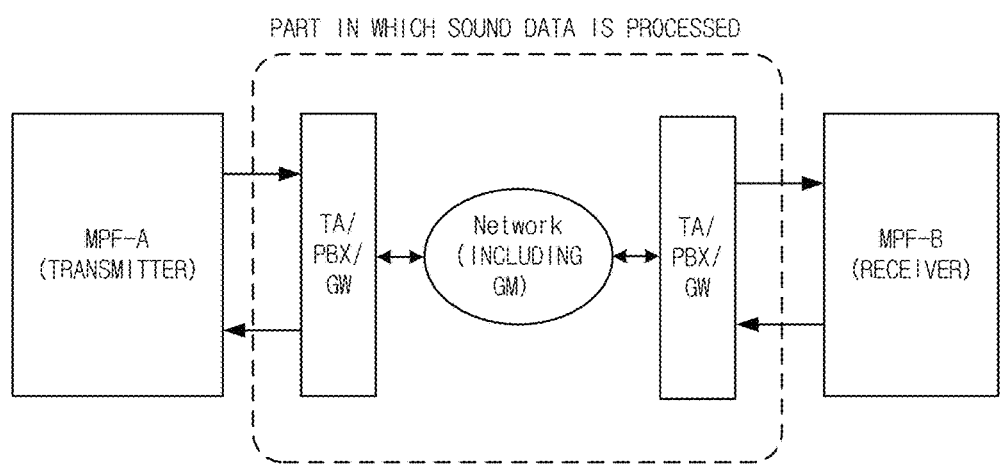
FIG. 25 is a view showing the part in which the sound data is processed in the IP telephone network.
Figure 26:
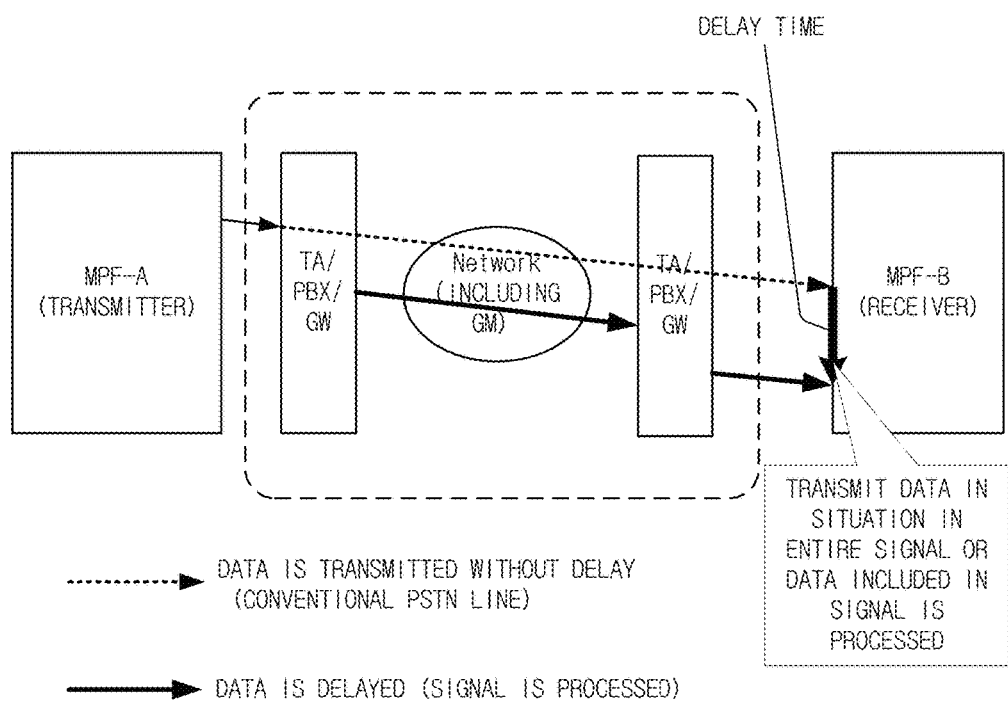
FIG. 26 is a view showing an example of the delay in the signal transmission in the IP telephone network.
Figure 27:
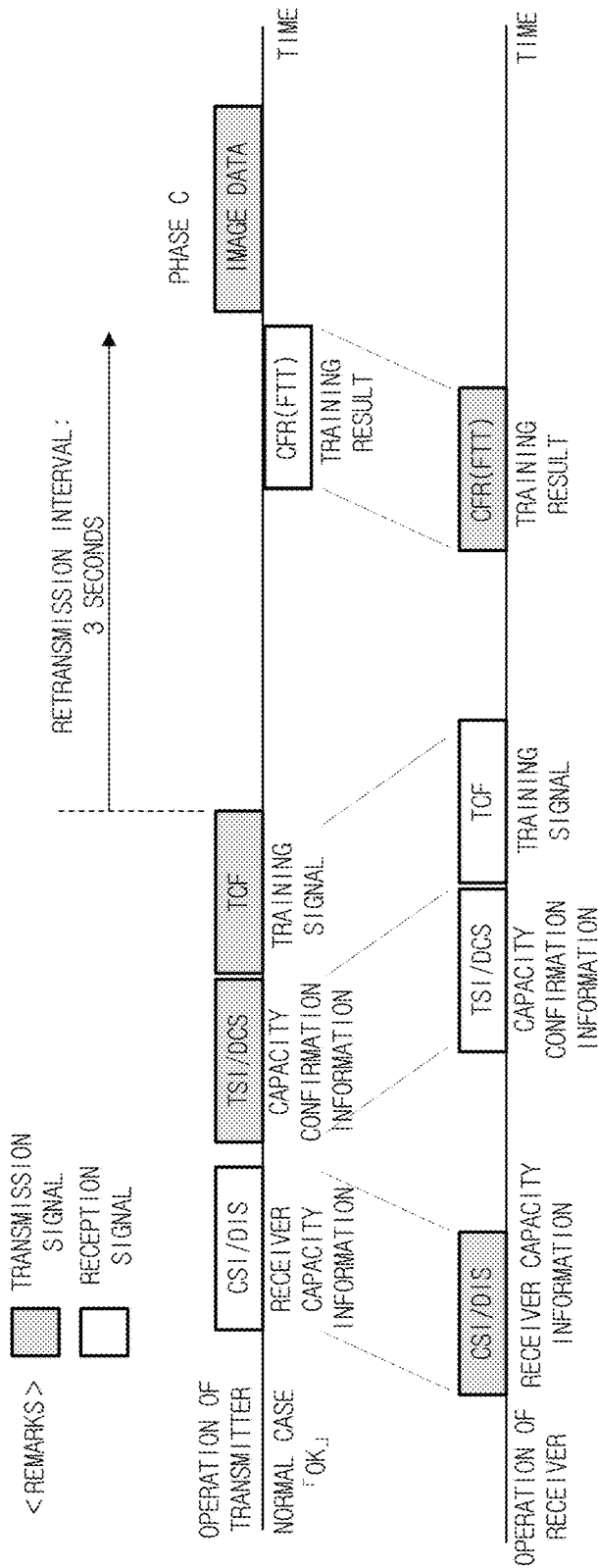
FIG. 27 is a view showing an example of the normal communication procedure (communication sequence)

FIG. 24 is a flowchart showing the process for specifying the extracted section, which is carried out by the communication disturbance analysis device 105 (or the communication disturbance analysis device included in the facsimile communication device 110). Firstly, the recorded data of the transmitter and the recorded data of the receiver, which are related to the same ID, are obtained (Step S301). Next, the silence section is detected from each recorded data (Step S302).

It is checked whether the silence section detected from the recorded data of the transmitter is overlapped with the silence section detected from the recorded data of the receiver, and the a pair of the silence sections having the overlapped part is extracted (Step S303).

The earlier of the start timings of two paired silence sections having the overlapped part is set to the start timing of the extracted section. The later of the end timings of the above two paired silence sections is set to the end timing of the extracted section. Thereby, the extracted section is specified (Step S304).

The extracted section is extended by the predetermined time or in accordance with the control signals. Then, the extended extracted section is set as the extracted section (Step S305).

The recorded data corresponding to the set extracted section is extracted from each of the recorded data of the transmitter and the recorded data of the receiver, and is stored (or output) (Step S306). Then, the process is ended.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

The judgment condition for judging that the facsimile device of the opposite side disconnects the line in the facsimile communication may be only the first change in which the line voltage is increased to the first voltage or more. Alternatively, the additional condition (1) (the detection of the periodic change or the busy tone) may be combined with the first change, the additional condition (2) (communication acknowledgement) may be combined with the first change, or the additional condition (1) and the additional condition (2) may be combined with the first change. The detection of the first change is the necessary judgment condition and is a trigger for judging whether the additional condition (1) or (2) is satisfied.

In the first embodiment, the line voltage is measured after the line capture and before the dial, and the measured line voltage is stored as the first voltage in the line voltage storing unit 18. However, the judgment unit 35 may judge that the first change is caused when the line voltage is increased to the predetermined voltage (for example, 0.5V) or more in the facsimile communication or when the line voltage is maintained at the predetermined voltage or more for the predetermined time in the facsimile communication.

The present invention is not limited to G3 or Super G3 standard, and can be applied in any facsimile standard.

In case that the facsimile communication device 110 which is the transmitter has the function as the communication disturbance analysis device, the facsimile communication device 110 which is the transmitter may analyze the recorded data. Similarly, in case that the facsimile communication device 110 which is the receiver has the function as the communication disturbance analysis device, the facsimile communication device 110 which is the receiver may analyze the recorded data. Alternatively, the communication disturbance analysis device 105 which is independent from the transmitter and the receiver may analyze the recorded data. Each of the transmitter and the receiver may carry out a part of the analysis of the disturbance, and the transmitter, the receiver or the independent communication disturbance analysis device 105 may carry out the remaining part of the analysis of the disturbance. For example, each of the transmitter and the receiver may carry out the process for the analysis until the silence section is extracted from the recorded data (until the first table 151 and the second table 152 are prepared).

The method for obtaining the recorded data to be analyzed by the transmitter, the receiver or the independent communication disturbance analysis device 105 may be optional. For example, a device in which the recorded data is stored may be instructed to forward the recorded data by transmitting the predetermined command to the above device. Alternatively, the transmitter and the receiver may transmit the recorded data to a server to collect the recorded data in the server, and a device which analyzes the disturbance (the transmitter, the receiver or the independent communication disturbance analysis device 10) may obtain the recorded data from the server.

In the second embodiment, the transmitter determines the ID and transmits the determined ID to the receiver. Then, the recorded data of the transmitter and the recorded data of the receiver are related to the same ID, and the recorded data of the transmitter in one communication is related to the recorded data of the receiver in the above one communication by using the ID. The method for relating the recorded data to each other is not limited to this. For example, the date and time of the start of the communication is recorded on each recorded data of the transmitter and the receiver, and by using the above date and time as the information for relating the recorded data, the recorded data of the transmitter may be related to the recorded data of the receiver. In this case, in consideration of the international call, it is preferable to adopt the Greenwich Mean Time (GMT) when the above date and time is recorded. Alternatively, the time difference of the above data and time may be corrected.

In the first embodiment, it is judged whether the facsimile device of the opposite side opens the line in accordance with the change in the line voltage in the facsimile communication. Thereby, it is possible to detect the open of the line, which is caused in the facsimile device of the opposite side, at any time during the facsimile communication without depending on the protocol.

In the first embodiment, the line voltage storing unit stores the first voltage obtained by measuring the line voltage after the line capture and before the dialing. The judgment unit judges that the facsimile device of the opposite side opens the line in case that the predetermined judgment condition including the condition in which the line voltage is changed to the first voltage or more in the facsimile communication is satisfied.

In the first embodiment, the judgment unit judges that the facsimile device of the opposite side opens the line in case that the predetermined judgment condition including the condition in which the line voltage is changed to the first voltage or more in the facsimile communication and then the line voltage is periodically changed is satisfied. The second change may be detected by triggering the detection of the first change.

In the first embodiment, the judgment unit judges that the facsimile device of the opposite side opens the line in case that the predetermined judgment condition including the condition in which the line voltage is changed to the first voltage or more in the facsimile communication and the facsimile device of the opposite side does not respond in the communication acknowledgement is satisfied. The communication acknowledgement may be executed by triggering the detection of the first change.

In the first embodiment, the judgment unit judges that the facsimile device of the opposite side opens the line in case that the predetermined judgment condition including the condition in which the line voltage is changed to the first voltage or more in the facsimile communication and then the busy tone is detected is satisfied.

In the first embodiment, the type of communication error is specified by classifying the type of error according to the timing at which the facsimile device of the opposite side opens the line in the facsimile communication procedure.

One of the objects of the second embodiment is to provide a communication disturbance analysis device and a non-transitory recording medium storing a computer readable program which can effectively analyze the cause of the disturbance in accordance with the recorded data of the communication sound.

In the second embodiment, the silence section is extracted from each of the first recorded data in which the communication sound is recorded in the transmitter and the second recorded data in which the communication sound is recorded in the receiver. In accordance with the extracted silence sections, the extracted section which is extracted as the recorded data to be analyzed from the first and the second recorded data is specified. Because the part which is effective for the analysis of the disturbance is automatically extracted from the long recorded data, it is possible to reduce the work for analyzing the disturbance in accordance with the recorded data.

In the second embodiment, because the control signal is transmitted from the transmitter and the receiver alternately in the facsimile communication, in case that after one of the transmitter and the receiver transmits the specific control signal, the above one of the transmitter and the receiver retransmits the same specific control signal without receiving the control signal from the facsimile device of the opposite side, the period from the transmission of the specific control signal to the retransmission of the same specific control signal is detected as the silence section.

In the second embodiment, in the recorded data which is recorded in one of the transmitter and the receiver, the signal level of the control signal transmitted from the above one of the transmitter and the receiver is higher than the signal level of the control signal received from the facsimile device of the opposite side. Further, the type of the control signal is judged in accordance with the frequency of the signal. Therefore, in case that the frequency of the signal having the signal level exceeding the predetermined threshold value, which is detected next after the signal (the first signal) having the specific frequency and the signal level exceeding the predetermined threshold value is detected, is the same as the frequency of the signal which is previously detected, it is judged that the same control signal is retransmitted. Further, the period from the detection of the first signal to the detection of the second signal is detected as the silence section.

In the second embodiment, even when the line is disconnected due to the on-hook operation which is manually carried out by a user or the like, the silence section can be detected.

In the second embodiment, in case that the silence section detected from the first recorded data is overlapped with the silence section detected from the second recorded data, the period including at least one of the silence sections is specified as the section to be extracted.

In the second embodiment, in case that the silence section detected from the first recorded data is overlapped with the silence section detected from the second recorded data, the period in which both of the silence sections are overlapped is specified as the section to be extracted.

In the second embodiment, in case that the control signal transmitted from one of the communication devices at the starting point of the silence section is not detected from the recorded data recorded in the other of the communication devices, it is judged that the lack of the signal or the delay in the signal is caused. The period in which the lack of the signal or the delay in the signal is included is specified as the extracted section.

In the second embodiment, by including the recorded data which is recorded in the vicinity of the original extracted section which is originally specified, in the extracted section, it is possible to easily analyze the cause of the disturbance.

In the second embodiment, in case that the same phenomenon is caused a plurality of times, the recorded data for one time of the phenomenon is sufficient for the analysis of the disturbance. Therefore, by selecting the recorded data for one time of the phenomenon and discarding the recorded data for the remaining same phenomenon, it is possible to effectively narrow the recorded data to be analyzed.

In the second embodiment, because the off-hook operation is clarified as the reference point of the start of the communication, the starting point and the ending point of the silence section and those of the extracted section are expressed by the time information obtained by measuring the time based on the off-hook operation.

According to the second embodiment, it is possible to effectively analyze the cause of the disturbance in accordance with the recorded data of the communication sound.

According to the facsimile communication device, the line disconnection judgment method and the non-transitory recording medium storing a computer readable program, it is possible for the transmitter to detect the abnormality in the receiver soon without depending on the FAX communication standard in order to handle the abnormality, for example, to disconnect the line.

Although embodiments of the present invention have been described and illustrated in detail, it is clearly understood that the same is by way of illustration and example only and not limitation, the scope of the present invention should be interpreted by terms of the appended claims.

What is claimed is:

1. A facsimile communication device, comprising:
a line voltmeter that measures a voltage of a line used for a facsimile communication; and
a hardware processor that:
detects a predetermined change in the voltage of the line, during the facsimile communication, wherein the predetermined change is a voltage increase caused by unplanned disconnection of a facsimile device of an opposite side; and
judges whether the facsimile device of the opposite side opens the line or not according to whether the predetermined change is detected.

2. The facsimile communication device of claim 1, further comprising a memory that stores a voltage which is the voltage of the line measured by the line voltmeter after the facsimile device of the opposite side responds to a communication request,
wherein the hardware processor detects a first change in which the voltage of the line is increased from the stored voltage in the facsimile communication, and
the hardware processor judges that the facsimile device of the opposite side opens the line in case that a predetermined judgment condition including a condition in which the first change is detected is satisfied.

3. The facsimile communication device of claim 2, wherein:
the hardware processor detects a second change in which the voltage of the line is periodically changed, and
the predetermined judgment condition includes a condition in which the second change is detected after the first change is detected by the hardware processor.

4. The facsimile communication device of claim 2, wherein:
the hardware processor executes a communication acknowledgement with the facsimile device of the opposite side after the first change is detected, and
the predetermined judgment condition includes a condition in which a response is not received from the facsimile device of the opposite side in the communication acknowledgement.

5. The facsimile communication device of claim 4, wherein in case that the first change is detected in a transmission of an image data, the hardware processor stops the transmission of the image data, transmits a post message and waits for the response to the post message from the facsimile device of the opposite side as the communication acknowledgement.

6. The facsimile communication device of claim 5, wherein in the post message, number of frames to be transmitted in case that the image data is transmitted without stopping the transmission of the image data, is included.

7. The facsimile communication device of claim 2, further comprising a busy tone detector,
wherein:
after the first change is detected, the hardware processor instructs the busy tone detector to detect a busy tone as a detection operation, and
the predetermined judgment condition includes a condition in which the busy tone is detected in the detection operation after the first change is detected.

8. The facsimile communication device of claim 1, wherein:
the hardware processor specifies a type of a communication error, and
in case that the line is opened in the facsimile device of the opposite side, the hardware processor specifies the type of the communication error according to a timing at which the line is opened in a facsimile communication procedure.

9. A line disconnection judgment method to be executed by a facsimile communication device, comprising:
repeatedly measuring a voltage of a line used for a facsimile communication;
detecting a predetermined change in the voltage of the line, during the facsimile communication, wherein the predetermined change is a voltage increase caused by unplanned disconnection of a facsimile device of an opposite side; and
judging whether the facsimile device of the opposite side opens the line or not according to whether the predetermined change is detected.

10. A non-transitory recording medium storing a computer readable program causing a facsimile communication device comprising a line voltmeter that measures a voltage of a line used for a facsimile communication, to perform operations comprising:
repeatedly measuring the voltage of the line by using the line voltmeter;
detecting a predetermined change in the voltage of the line, during the facsimile communication, wherein the predetermined change is a voltage increase caused by unplanned disconnection of a facsimile device of an opposite side; and
judging whether the facsimile device of the opposite side opens the line or not according to whether the predetermined change is detected.

* * * * *